US009619507B2

(12) United States Patent
Chang et al.

(10) Patent No.: US 9,619,507 B2
(45) Date of Patent: Apr. 11, 2017

(54) TRANSACTION PROTOCOL FOR READING DATABASE VALUES

(71) Applicant: Palantir Technologies, Inc., Palo Alto, CA (US)

(72) Inventors: Allen Chang, Mountain View, CA (US); John Antonio Carrino, Menlo Park, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/580,218

(22) Filed: Dec. 23, 2014

(65) Prior Publication Data
US 2015/0112956 A1 Apr. 23, 2015

Related U.S. Application Data

(63) Continuation of application No. 13/958,817, filed on Aug. 5, 2013, now Pat. No. 8,954,410, which is a
(Continued)

(51) Int. Cl.
*G06F 7/00* (2006.01)
*G06F 17/00* (2006.01)
*G06F 17/30* (2006.01)

(52) U.S. Cl.
CPC .. *G06F 17/30371* (2013.01); *G06F 17/30171* (2013.01); *G06F 17/30359* (2013.01)

(58) Field of Classification Search
CPC ............ G06T 9/007; G09G 2310/0224; G09G 2340/02; G09G 2340/0407
(Continued)

(56) References Cited

U.S. PATENT DOCUMENTS 5,724,575 A 3/1998 Hoover et al.
5,872,973 A 2/1999 Mitchell et al.
(Continued)

FOREIGN PATENT DOCUMENTS

EP 2555126 2/2013

OTHER PUBLICATIONS

Antoshenkov, Gennady, "Dictionary-Based Order-Preserving String Compression," The VLDB Journal, 1997, vol. 6, pp. 26-39.
(Continued)

*Primary Examiner* — Hosain Alam
*Assistant Examiner* — Nicholas Allen
(74) *Attorney, Agent, or Firm* — Hickman Palermo Backer Bingham LLP

(57) ABSTRACT

Techniques are provided for more efficient multi-row atomic, consistent, isolated and durable (ACID)-compliant transactions with snapshot isolation semantics (or just "multi-row transactions" for short). In some embodiments, the techniques are implemented in a computing system that includes a client application, a lightweight in-memory lease-based lock service, a multi-row transaction orchestrator, and an underlying database system. The transaction orchestrator implements a read protocol and a write protocol that provides support to the client application for carrying out multi-row transactions against the underlying database system irrespective of whether the database system itself supports multi-row transactions. The transaction orchestrator explicitly maintains transaction-level locks obtained from the lease-based lock service as part of the transaction protocol. Further, the transaction orchestrator is tolerant to lock service failure and unavailability without compromising ACID-compliance and snapshot isolation guarantees to the client application.

20 Claims, 11 Drawing Sheets

Related U.S. Application Data continuation of application No. 13/224,500, filed on Sep. 2, 2011, now Pat. No. 8,504,542.

(58) Field of Classification Search
USPC .......................................................... 707/704
See application file for complete search history.

(56) References Cited

U.S. PATENT DOCUMENTS

| | | | |
|---|---|---|---|
| 5,897,636 A | 4/1999 | Kaeser | |
| 6,073,129 A | 6/2000 | Levine et al. | |
| 6,161,098 A | 12/2000 | Wallman | |
| 6,243,717 B1 | 6/2001 | Gordon et al. | |
| 6,304,873 B1 | 10/2001 | Klein et al. | |
| 6,366,933 B1 | 4/2002 | Ball et al. | |
| 6,418,438 B1 | 7/2002 | Campbell | |
| 6,510,504 B2 | 1/2003 | Satyanarayana | |
| 6,560,620 B1 | 5/2003 | Ching | |
| 6,574,635 B2 | 6/2003 | Stauber et al. | |
| 6,745,382 B1 | 6/2004 | Zothner | |
| 6,976,210 B1 | 12/2005 | Silva et al. | |
| 7,058,648 B1 | 6/2006 | Lightfoot et al. | |
| 7,111,231 B1 | 9/2006 | Huck et al. | |
| 7,461,158 B2 | 12/2008 | Rider et al. | |
| 7,725,530 B2 | 5/2010 | Sah et al. | |
| 7,725,728 B2 | 5/2010 | Ama et al. | |
| 7,730,082 B2 | 6/2010 | Sah et al. | |
| 7,730,109 B2 | 6/2010 | Rohrs et al. | |
| 8,041,714 B2 | 10/2011 | Aymeloglu et al. | |
| 8,112,425 B2 | 2/2012 | Baum et al. | |
| 8,126,848 B2 | 2/2012 | Wagner | |
| 8,185,819 B2 | 5/2012 | Sah et al. | |
| 8,504,542 B2 | 8/2013 | Chang et al. | |
| 8,676,857 B1 | 3/2014 | Adams et al. | |
| 8,930,331 B2 | 1/2015 | McGrew et al. | |
| 2001/0051949 A1 | 12/2001 | Carey et al. | |
| 2002/0091694 A1 | 7/2002 | Hrle et al. | |
| 2003/0105759 A1 | 6/2003 | Bess et al. | |
| 2003/0115481 A1 | 6/2003 | Baird et al. | |
| 2003/0120675 A1 | 6/2003 | Stauber et al. | |
| 2003/0212718 A1 | 11/2003 | Tester | |
| 2004/0111410 A1 | 6/2004 | Burgoon et al. | |
| 2004/0117345 A1 | 6/2004 | Bamford et al. | |
| 2004/0117387 A1 | 6/2004 | Civetta et al. | |
| 2004/0148301 A1 | 7/2004 | McKay et al. | |
| 2005/0097441 A1 | 5/2005 | Herbach et al. | |
| 2005/0108231 A1 | 5/2005 | Findleton et al. | |
| 2005/0114763 A1 | 5/2005 | Nonomura et al. | |
| 2005/0125436 A1* | 6/2005 | Mudunuri ......... G06F 17/30398 | |
| 2005/0289524 A1 | 12/2005 | McGinnes | |
| 2006/0074881 A1 | 4/2006 | Vembu et al. | |
| 2006/0080316 A1 | 4/2006 | Gilmore et al. | |
| 2006/0116991 A1 | 6/2006 | Calderwood | |
| 2006/0161558 A1 | 7/2006 | Tamma et al. | |
| 2006/0218206 A1 | 9/2006 | Bourbonnais et al. | |
| 2006/0218491 A1 | 9/2006 | Grossman et al. | |
| 2006/0242630 A1 | 10/2006 | Koike et al. | |
| 2006/0253502 A1 | 11/2006 | Raman et al. | |
| 2006/0265397 A1 | 11/2006 | Bryan et al. | |
| 2007/0050429 A1 | 3/2007 | Goldring et al. | |
| 2007/0061487 A1 | 3/2007 | Moore et al. | |
| 2007/0118547 A1* | 5/2007 | Gupta ............... G06F 17/30336 | |
| 2007/0143253 A1 | 6/2007 | Kostamaa et al. | |
| 2007/0233756 A1 | 10/2007 | D'Souza et al. | |
| 2007/0271317 A1 | 11/2007 | Carmel | |
| 2008/0015970 A1 | 1/2008 | Brookfield et al. | |
| 2008/0104149 A1 | 5/2008 | Vishniac et al. | |
| 2008/0195672 A1 | 8/2008 | Hamel et al. | |
| 2008/0270316 A1 | 10/2008 | Guidotti et al. | |
| 2008/0301378 A1* | 12/2008 | Carrie ........................ 711/147 | |
| 2009/0031247 A1 | 1/2009 | Walter et al. | |
| 2009/0037417 A1* | 2/2009 | Shankar ............ G06F 17/30362 | |
| 2009/0106308 A1 | 4/2009 | Killian et al. | |
| 2009/0164387 A1 | 6/2009 | Armstrong et al. | |
| 2009/0172669 A1* | 7/2009 | Bobak ........................ G06F 8/34 718/100 |
| 2009/0240664 A1* | 9/2009 | Dinker .................. G06F 12/0842 |
| 2009/0271435 A1 | 10/2009 | Yako et al. | |
| 2009/0313223 A1 | 12/2009 | Rantanen | |
| 2009/0313311 A1 | 12/2009 | Hoffmann et al. | |
| 2010/0036831 A1 | 2/2010 | Vemuri et al. | |
| 2010/0076939 A1 | 3/2010 | Iwaki et al. | |
| 2010/0082541 A1 | 4/2010 | Kottomtharayil | |
| 2010/0114817 A1 | 5/2010 | Broeder et al. | |
| 2010/0114831 A1 | 5/2010 | Gilbert et al. | |
| 2010/0121817 A1* | 5/2010 | Meyer ............... G06F 17/30893 707/623 |
| 2010/0138842 A1 | 6/2010 | Balko et al. | |
| 2010/0145909 A1 | 6/2010 | Ngo | |
| 2010/0161565 A1 | 6/2010 | Lee et al. | |
| 2010/0161688 A1 | 6/2010 | Kesselman et al. | |
| 2010/0173619 A1* | 7/2010 | Hua ..................... G06F 19/3412 455/414.2 |
| 2010/0191884 A1* | 7/2010 | Holenstein .......... G06F 11/2094 710/200 |
| 2010/0211550 A1 | 8/2010 | Daniello et al. | |
| 2010/0211618 A1 | 8/2010 | Anderson et al. | |
| 2010/0235606 A1 | 9/2010 | Oreland et al. | |
| 2010/0281458 A1* | 11/2010 | Paladino ................... G06F 8/71 717/106 |
| 2010/0283787 A1 | 11/2010 | Hamedi et al. | |
| 2010/0318838 A1* | 12/2010 | Katano ............... G06F 11/0712 714/4.1 |
| 2010/0325581 A1 | 12/2010 | Finkelstein et al. | |
| 2011/0029498 A1 | 2/2011 | Ferguson et al. | |
| 2011/0093440 A1* | 4/2011 | Asakura ............. G06F 11/1471 707/685 |
| 2011/0161132 A1* | 6/2011 | Goel ..................... G06Q 10/06 705/7.26 |
| 2011/0173619 A1 | 7/2011 | Fish | |
| 2011/0184813 A1 | 7/2011 | Barne et al. | |
| 2011/0258242 A1 | 10/2011 | Eidson et al. | |
| 2011/0270812 A1 | 11/2011 | Ruby | |
| 2012/0013684 A1 | 1/2012 | Lucia | |
| 2012/0150791 A1 | 6/2012 | Willson | |
| 2012/0159307 A1 | 6/2012 | Chung et al. | |
| 2012/0330908 A1 | 12/2012 | Stowe et al. | |
| 2013/0036346 A1 | 2/2013 | Cicerone | |
| 2013/0097130 A1 | 4/2013 | Bingol et al. | |
| 2013/0318060 A1 | 11/2013 | Chang et al. | |
| 2014/0149272 A1 | 5/2014 | Hirani et al. | |
| 2014/0344231 A1 | 11/2014 | Stowe et al. | |
| 2015/0112956 A1* | 4/2015 | Chang et al. ................. 707/703 |

OTHER PUBLICATIONS

"Apache HBase," <http://hbase.apache.org/> printed Sep. 14, 2011 in 1 page.

"BackTult—JD Edwards One World Version Control System," printed Jul. 23, 2007 in 1 page.

Baker et al., "Megastore: Providing Scalable, Highly Available Storage for Interactive Services," 5th Biennial Conference on Innovative Data Systems Research (CIDR '11), Jan. 9-12, 2011, Asilomar, California, pp. 12.

Bernstein et al., "Hyder—A Transactional Record Manager for Shared Flash," 5th Biennial Conference on Innovative Data Systems Research (CIDR '11), Jan. 9-12, 2011, Asilomar, California, pp. 12.

Chang et al., "Bigtable: A Distributed Storage System for Structured Data", Google, Inc., OSDI'06: Seventh Symposium on Operating System Design and Implementation, Seattle, WA, Nov. 2006, pp. 14.

Devanbu et al., "Authentic Third-party Data Publication," 2000, pp. 19, http://www.cs.ucdavis.edu/~devanbu/authdbpub.pdf.

Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

Elmasri et al., "Fundamentals of Database Systems," 2004, Fourth Edition, pp. 455-491.

(56) References Cited

OTHER PUBLICATIONS

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17-22, 2007, Vancouver, British Columbia, Canada, pp. 1-10.

Nierman, "Evaluating Structural Similarity in XML Documents," 2002, 6 pages.

Peng et al., "Large-scale Incremental Processing Using Distributed Transactions and Notifications" Proceedings of the 9th USENIX Symposium on Operating Systems Design and Implementation, USENIX, 2010, pp. 14.

"The Apache Cassandra Project," <http://cassandra.apache.org/> printed Sep. 14, 2011 in 3 pages.

Thomson et al., "The Case for Determinism in Database Systems," The 36th International Conference on Very Large Data Bases, Sep. 13-17, 2010, Singapore, Proceedings of the VLDB Endowment, vol. 3, No. 1, pp. 11.

Wollrath et al., "A Distributed Object Model for the Java System," Conference on Object-Oriented Technologies and Systems, Jun. 17-21, 1996, pp. 219-231.

Yang et al., "HTML Page Analysis Based on Visual Cues," 2001, pp. 859-864.

Official Communication for European Patent Application No. 12182274.6 dated Nov. 5, 2012.

European Claims in application No. 12182274.6, dated Nov. 2012, 5 pages.

* cited by examiner

FIG. 3

| Key | Primary Contact # | Bank Balance |
|---|---|---|
| Alice | 5: (555) 233-1277 | 7: $2<br>5: $12 |
| Bob | 3: (555) 522-7789 | 7: $13<br>3: $3 |

FIG. 6

| Key | Primary Contact # | Bank Balance |
|---|---|---|
| Alice | 5: (555) 233-1277 | 9: $12<br>7: $2<br>5: $12 |
| Bob | 3: (555) 522-7789 | 9: $3<br>7: $13<br>3: $3 |

TRANSACTION PROTOCOL FOR READING DATABASE VALUES

CROSS REFERENCE TO RELATED APPLICATIONS

This application claims benefit under 35 U.S.C. §120 as a Continuation of application Ser. No. 13/958,817, filed Aug. 5, 2013, which is a Continuation of application Ser. No. 13/224,500, filed Sep. 2, 2011 (now U.S. Pat. No. 8,504,542 issued Aug. 6, 2013), the entire contents of each of which is hereby incorporated by reference as if fully set forth herein. The applicant(s) hereby rescind any disclaimer of claim scope in the parent applications or the prosecution history thereof and advise the USPTO that the claims in this application may be broader than any claim in the parent applications.

TECHNICAL FIELD

Embodiments relate generally to database systems, and, more specifically, to techniques for more efficient multi-row transactions.

BACKGROUND

Computers are very powerful tools for accessing and storing vast amounts of information. Computer databases are a common mechanism for storing information on computer systems. A typical database is a collection of "tables" having "rows" with "columns" of information. For example, a database table of employees may have a row for each employee where each row contains columns designating specifics about the employee, such as the employee's name, address, salary, etc.

A database management system (DBMS) is typically provided as a software "layer" on top of the database itself (i.e., the data actually stored on a non-volatile storage device(s)). The DBMS controls and coordinates access to the database by other "client" software applications. Typically, all requests from clients to retrieve and store data in the database are processed by the DBMS. Thus, the client software applications may be viewed as a software layer on top of the DBMS with the DBMS being an intermediary software layer between the client applications and the database. A DBMS and the database it manages are often referred to collectively as just a "database system".

In recent years, the need for client applications to be able operate on very large database datasets has spurred the development of large-scale distributed database systems. A large-scale distributed database system typically is a database system in which the DBMS and/or the database is/are distributed among multiple computer systems. Large-scale distributed database systems often support highly-parallel database data processing computation. Today, some large-scale distributed database systems manage between hundreds of gigabytes up to multiple petabytes of database data and are distributed over tens, hundreds, even thousands of computer systems.

Large-scale distributed database systems typically support only basic database functionality and may not support a full relational database model as a trade-off of being able to scale up to support highly-parallel client applications such as those that can be found in a some cloud computing environments. For example, some large-scale distributed database systems support only simple query syntax and do not provide full Structured Query Language (SQL) or join support. In addition, some of these systems provide only single atomic writes based on row locks and provide only limited transactional support as a trade-off for reduced overhead in supporting strongly consistent distributed transactions. Many of these systems include a distributed, column-oriented database. One example of a distributed, column-oriented database is Google's Bigtable. See F. Chang, J. Dean, S. Ghemawat, W. C. Hsieh, D. A. Wallach, M. Burrows, T. Chandra, A. Fikes, and R. Bruger, "Bigtable: A Distributed Storage System for Structured Data", OSDI, 205-218, USENIX Association, 2006. An open-source example of a large-scale distributed database system is Apache HBase currently available from the Apache Software Foundation at the Internet domain hbase.apache.org.

Recently, in an effort to make it easier for developers of client applications to reason about the state of the large-scale distributed databases that the client applications read from and write to, solutions have been developed to provide support for multi-row ACID (Atomic, Consistent, Isolated, and Durable)-compliant transactions with snapshot isolation semantics (or just "multi-row transactions" for short). With snapshot isolation, typically all row reads from the database within a transaction "see" a consistent snapshot of the database that remains unaffected by any other concurrent transactions. Further, any row writes to the database within the transaction typically are committed to the database only if none of the row writes conflict with any concurrent write committed to the database since that snapshot. To provide snapshot isolation, some of these solutions store in the database multiple time-stamped versions of each data item, a technique known as Multi-Version Concurrency Control (MVCC). A potential benefit of MVCC is more efficient row reads because reading a data item from a row typically does not require acquiring a lock on the row. Further, MVCC may protect against write-write conflicts. For example, if multiple transactions running concurrently write to the same cell (e.g., row/column pair), at most one of the transactions will be allowed to commit its write to the cell. Google's Percolator system built on top of its Bigtable distributed database is one example of a large-scale distributed database system that provides support for multi-row transactions. See "Large-scale Incremental Processing Using Distributed Transactions and Notifications", Daniel Peng, Frank Dabek, Proceedings of the 9th USENIX Symposium on Operating Systems Design and Implementation, 2010, a PDF copy of which is currently available via HTTP at /research/pubs/archive/36726.pdf in the www.google.com Internet domain.

Some current solutions implement multi-row transactions with an additional software layer (transaction service) that executes on top of an existing large-scale distributed database system (e.g., HBase, Bigtable, etc.). In some cases, this is a design goal of such solutions to avoid requiring modifications to the existing systems. As a result, these solutions generally do not integrate locking functionality for implementing multi-row transactions into the underlying database system. Nor do these solutions typically employ a centralized global deadlock detection process as that may hinder horizontal scaling of the system. As a result, locks for implementing multi-row transactions may be explicitly maintained by the transaction service itself.

Current multi-row transaction services for large-scale distributed databases may implement multi-row transactions with a two-phase commit transaction protocol. During a transaction initiated by a client application, row writes within the transaction may be buffered until the client commits the transaction at which point the transaction service initiates the two-phase commit process. In the first commit phase of the transaction, the buffered row writes and associated lock metadata are atomically written to the database using row-level transactions provided by the underlying database system (e.g., HBase, Bigtable, etc.). The lock metadata is generated and used by the transaction service for detecting conflicts (e.g., write-write conflicts) between different transactions. In the second phase, assuming no other transactions conflict with the current transaction, the transaction service commits the current transaction by atomically modifying the lock metadata in the database for the current transaction using a row level transaction provided by the underlying database system.

Lock metadata of current transaction services may be stored in the database in non-volatile memories where it can persist in the case of a system failure (e.g., power outage). If lock metadata were to disappear between the two phases of commit, the transaction service might mistakenly commit two transactions that should have conflicted. In current systems, row writes during the first commit phase typically require a volatile-memory to non-volatile memory synchronization operation to ensure that associated lock metadata is actually persisted (i.e., stored in non-volatile memory) rather than just being stored in a volatile-memory-based write cache or other volatile memory where the metadata could be lost in the event of a failure. Volatile-memory to non-volatile memory synchronization operations often require physical movement of mechanical components (e.g., disk platters, read/write heads, etc.) of non-volatile storage device(s) making these synchronization operations much slower than volatile-memory-only synchronization operations. As a result, the requirement of current transaction services that lock metadata be persisted in the database, as well as adding to the size of the database, can increase the latency of transaction commit operations; perhaps to the point that is intolerable for some types of database tasks such as, for example, some online transaction processing tasks. This increased latency can be mitigated by increasing parallelism of the system at the expense of additional computer systems and associated management overhead. However, some users of large-scale distributed database systems may want support for multi-row transactions without having to incur additional expenses for scaling current systems to provide lower-latency commits.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates rows of a database in which database values are versioned using a timestamp dimension, in accordance with some embodiments of the present invention.

FIG. 6 illustrates rows of a database in which database values are versioned using a timestamp dimension, in accordance with some embodiments of the present invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for more efficient multi-row atomic, consistent, isolated and durable (ACID)-compliant transactions with snapshot isolation semantics (or just "multi-row transactions" for short). For example, techniques are provided for using a lightweight in-memory lease-based lock-service that does not require persisting lock metadata to a non-volatile data storage medium.

In some embodiments of the present invention, the techniques are implemented in a computing system that includes a client application, the lease-based lock service, a multi-row transaction orchestrator, and an underlying database system. The transaction orchestrator implements a read protocol and a write protocol that provides support to the client application for carrying out multi-row transactions against the underlying database system irrespective of whether the database system itself supports multi-row transactions.

In some embodiments of the present invention, the transaction orchestrator explicitly maintains transaction-level locks obtained from the lease-based lock service as part of the transaction protocol. Further, the transaction orchestrator and, in particular, the read and write transaction protocol, is tolerant to lock service failure and unavailability without compromising ACID-compliance and snapshot isolation guarantees to the client application.

While embodiments of the present invention are directed to techniques for more efficient multi-row transactions, the embodiments may apply to single-row transactions as well. However, as the underlying database system may provide support for single-row transactions, it is expected that in most cases the greatest benefit of implementing the disclosed techniques will inure to client applications that conduct multi-row transactions.

System Overview

Figure 1:
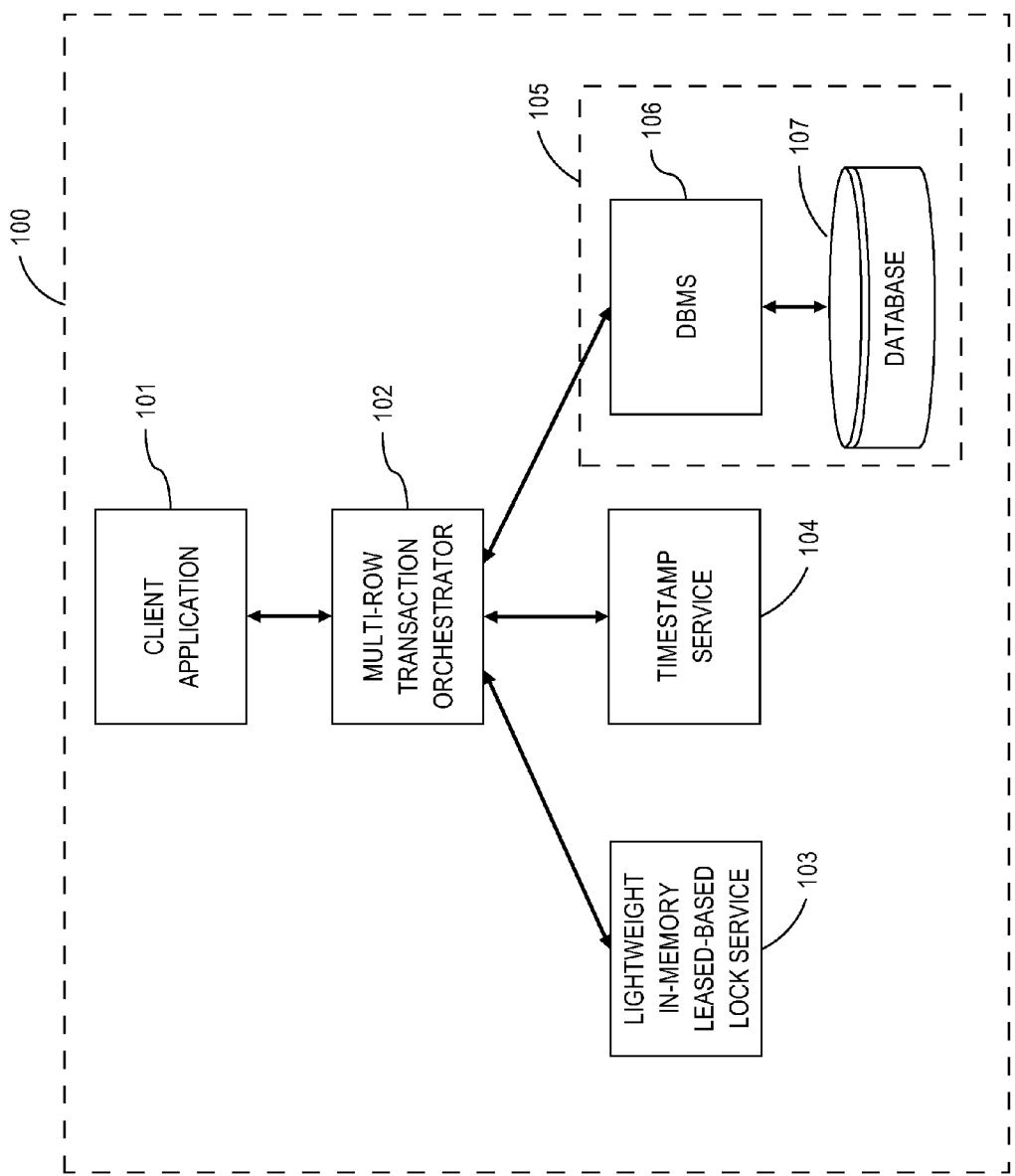
FIG. 1 illustrates a computing system for implementing multi-row transactions, in accordance with some embodiments of the present invention.

FIG. 1 is a block diagram of a computing system 100 for implementing multi-row transactions, according to some embodiments of the present invention. As shown, the system 100 includes a client application 101, a multi-row transaction orchestrator 102, a lightweight in-memory lease-based lock service 103, a timestamp service 104, and an underlying database system 105. The database system 105 further includes a database management system 106 and a database 107.

Figure 11:
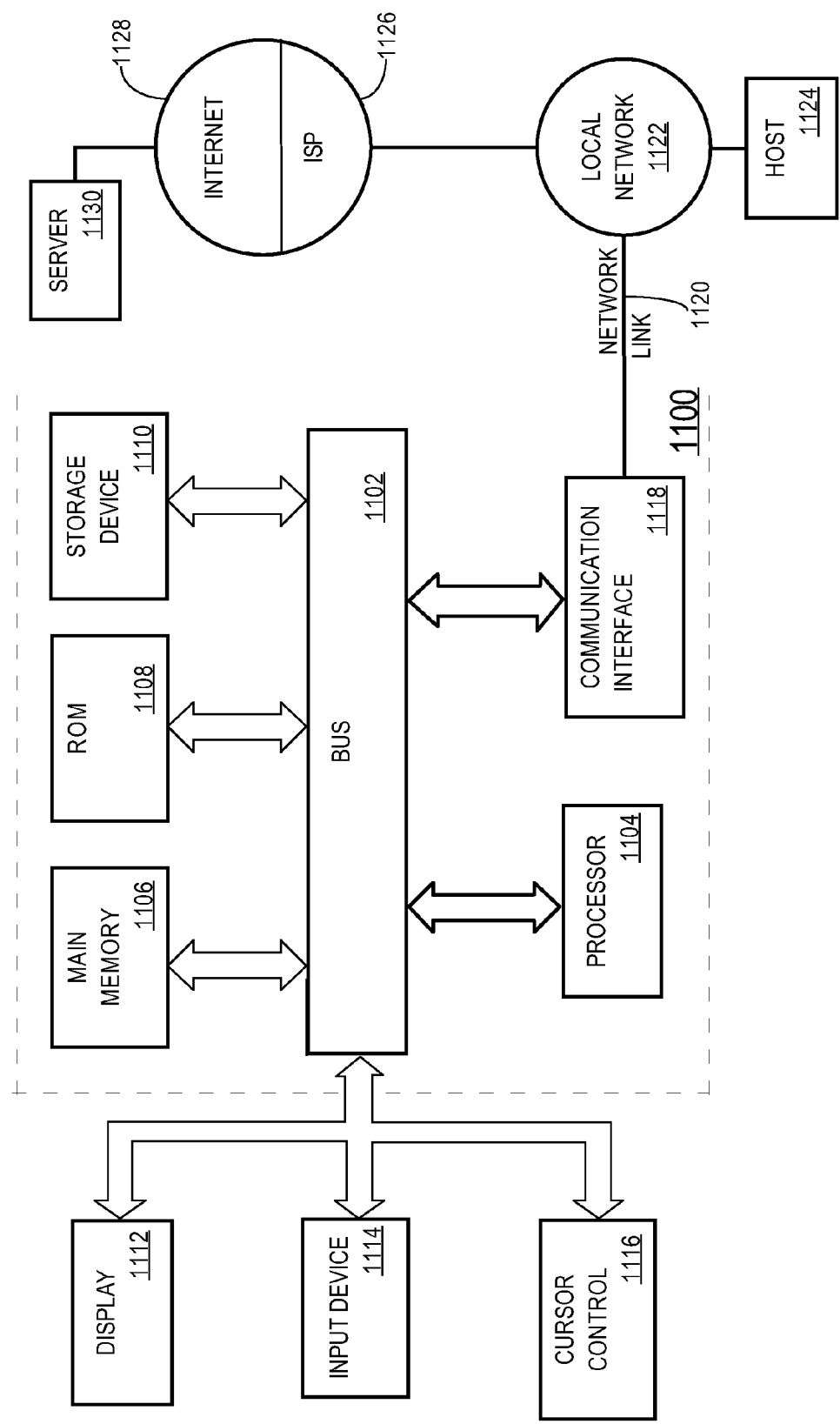
FIG. 11 illustrates a computer system on which embodiments of the present invention may be implanted.

The components 101-107 of the system 100 may all embodied within a single computing system such as the computer system 1100 of FIG. 11. Alternatively, one or more of the components 101-107 may be embodied within multiple computing systems in a distributed arrangement. Distributed components may be operatively connected to one another using any suitable data communication bus such as, for example, a data network. Further, distributed components may communicate with one another using any suitable data communication protocol such as an inter-process communication (IPC) mechanism or a remote procedure call (RPC) mechanism, as examples.

In some embodiments, the client application 101, the transaction orchestrator 102, the lock service 103, the timestamp service 104, and the database management system 106 are each implemented in software. However, one or more of these components may be implemented in hardware or a combination of hardware and software.

The transaction orchestrator 102 provides to the client application 101 the ability to randomly-access database 107. In addition, the transaction orchestrator 102 provides "transaction-ality" to the client application 101 so that multiple threads of the client application 101 can access and transform the database 107 concurrently in an orderly manner. More specifically, the transaction orchestrator 102 provides ACID-compliant transactions with snapshot isolation semantics to client applications to make it easier for programmers of client applications to reason about the state of the database 107 as they are developing (coding) the client applications.

In some embodiments, the transaction orchestrator 102 is a software library such as, for example, a static library or dynamic link library (DLL), that executes in the same process space as the client application 101. In other embodiments, the transaction orchestrator 102 executes as a computing process separate from the client application 101 computing process. Communication between the two processes may be facilitated using an inter-process communication (IPC) mechanism or a remote procedure call (RPC) mechanism, for example.

The transaction orchestrator 102 uses two additional services to provide multi-row transaction-ality to the client application 101: a timestamp service 104 and a lightweight in-memory leased-based lock service 103. Both of these services 103 and 104 may be network services that are communicatively and operatively coupled to the transaction orchestrator 102 via a data network such as, for example, a Local Area Network (LAN).

According to some embodiments, multiple executing client applications 101 concurrently access and transform the same database 107 each using a separate transaction orchestrator 102 instances. Each executing instance of the transaction orchestrator 102 may use the same timestamp service 104 and the same leased-based lock service 103 for coordinating and orchestrating multi-row transactions among the multiple client applications 101. However, a one-to-one correspondence between client applications 101 and transaction orchestrator 102 instances is not required and a single transaction orchestrator 102 instance can serve multiple client applications 101 or a single client application 101 may use multiple transaction orchestrator 102 instances.

The timestamp service 104 provides strictly increasing timestamps to the transaction orchestrator 102. As described in greater detail below, the transaction orchestrator 102 uses the timestamps received from the timestamp service 104 to implement the transaction protocol.

The lightweight in-memory leased-based lock service 103 provides the ability for the transaction orchestrator 102 to obtain and release locks on database 107 rows. The lock service 103 may maintain lock metadata for row locks in a volatile memory operatively coupled to the lock service 103 such as, for example, in a random-access memory (RAM). In this description, volatile memory includes any non-volatile memory that is used to implement virtual memory.

At the same time, the transaction orchestrator 102 provides ACID-compliant multi-row transaction-ality to the client application 101 even in cases where the lock service 103 fails and lock metadata is lost from volatile memory. The transaction orchestrator 102 does this in part by implementing a particular read and write transaction protocol that is tolerant to lock service 103 failures and does not require lock metadata to be durable (i.e., persisted to a non-volatile data storage medium). The write and read transaction protocol are described in greater detail below.

Underlying Database System

In some embodiments, the database system 105 is a "key-value" database system and the transaction orchestrator 102 is implemented as a computing layer on top of the key-value database system 105. The term "key-value" is not meant to imply any particular database system or imply any particular type of database system. Rather, "key-value" refers broadly to the general manner in which the database management system 106 presents the underlying database 107 to the transaction orchestrator 102. More specifically, the database management system 106 may present a key-value abstraction of the underlying database 107 to the transaction orchestrator 102 through an Application Programming Interface (API). The transaction orchestrator 102 uses the API provided by database management system 106 to add the ability to run multi-row transactions on top of this key-value layer.

The database management system 106 may be implemented by any one of a variety of different database management systems and embodiments of the invention are not limited to any particular database management system. For example, the database management system 106 may be implemented by a conventional relational database management system (RDBMS). Alternatively, as another example, the database management system 106 may be implemented using a "NoSQL" database management system or other database management system that differs from a traditional RDBMS in one or more respects. In one particular non-limiting embodiment, the database management system 106 is implemented using a version of the Apache HBase database management system.

The database 107 may be embodied as a collection of one or more file system files. For example, the database 107 may be embodied as a collection of one or more files of an operating system. Alternatively, the database 107 may be a file system itself. For example, the database 107 may be a distributed file system such as, for example, the Apache Hadoop Distributed File System (HDFS).

A goal of the transaction orchestrator 102 is to provide to the client application 101 the ability to conduct more efficient multi-row transactions against the underlying database 107 irrespective of whether the underlying database management system 106 also provides support for multi-row transactions. In many cases, the underlying database management system 106 will provide support for only single-row transactions. Thus, the transaction orchestrator 102 can be used to provide support for multi-row transactions on top of a database system 105 that supports only single-row transactions. While a variety of different database systems and different types of database systems may be used as the underlying database system 105, the transaction orchestrator 102 makes some assumptions about the operation of the underlying database system 105 when providing support for multi-row transactions to the client application 101. These assumptions will now be described.

Durability

The transaction orchestrator 102 assumes that the database system 105 is durable. That is, the database system 105 ensures that data that the database management system 106 successfully writes to the underlying database 107 permanently changes the state of the database 107. From the perspective of the transaction orchestrator 102, durability means that data that the database management system 106 indicates to the transaction orchestrator 102 as successfully written to the database 107 can be immediately read from the database 107 (assuming no intervening writes to the data) absent catastrophic database system 105 failure (e.g., act of nature). The database system 105 may ensure durability through use of one or more write-ahead logs, for example. Other techniques for ensuring durability are possible and embodiments are not limited to any particular technique.

Atomic Database Row Writes

The transaction orchestrator 102 assumes that writes performed by the database management system 106 to the database 107 are atomic at least within a "row" of the database 107. In other words, when the transaction orchestrator 102 commands the database management system 106 to write a row of the database 107, the write of the row either completely succeeds or completely fails, but does not partially succeed or partially fail. However, there is no requirement of the database management system 106 that multi-row writes be atomic across the multiple rows. Indeed, a purpose of the transaction orchestrator 102 is to provide support to client the application 101 for atomic multi-row writes irrespective of whether the database management system 106 itself supports multi-row transactions.

In general, however, a row of the database 107 is viewed from the perspective of the client application 101 as presented to it by the transaction orchestrator 102. In particular, the transaction orchestrator 102 presents a row of the database 107 to the client application 101 generally as a collection of one or more values, one for each of one or more columns of the row. This "row" as viewed by the client application 101 may or may not correspond directly to the notion of a "row" as presented by the database management system 106 to the transaction orchestrator 102. For example, where the database 107 is a relational database, a single row as viewed by the client application 101 may correspond to multiple rows of a relational table of the relational database.

For the purposes of the following discussion, unless otherwise apparent in context, the term "row" refers to a row of the database 107 viewed from the perspective of the client application 101 which may or may not correspond one-to-one to a row in the database 107 as presented by the underlying database management system 106 to the transaction orchestrator 102.

Strongly Consistent Row Writes

The underlying database system 105 may be distributed in the sense that the database 107 is stored on multiple storage devices that are not all operatively coupled to a single computing node that executes the database management system 106. In this context, "computing node" refers to a processor or set of processors that executes an instance of the database management system 106 as part of a cluster of multiple database management system 106 instances. Thus, in this case, the database management system 106 as a whole may viewed as executing on a cluster of multiple computing nodes.

In the case where the database system 105 is distributed, the transaction orchestrator 102 assumes that a write to a row of the database 107 is strongly consistent. That is, after the underlying database management system 106 has indicated to the transaction orchestrator 102 that a write to a row of the database 107 was successful, an immediately subsequent read of that value from the row will return the value successfully written (assuming no intervening writes to the row) regardless of which computing node in the cluster the transaction orchestrator 102 submits the subsequent read request to. In some embodiments, the database management system 106 ensures strongly consistent row writes using concurrency control mechanism that ensures that the subsequent read does not accidentally return the value in the row that existed prior to the write. However, other techniques for ensuring strongly consistent row writes may be possible and embodiments are not limited to any particular technique for implementing strongly consistent row writes.

Shared-Nothing Architecture

In some embodiments, the database system 105 is configured in a "shared nothing" architecture to facilitate horizontal scaling of the database system 105. Very generally, scaling the database system 105 "horizontally" refers to adding more computing nodes to the system 105 such that the database management system 106 and/or the database 107 operates on more computing nodes. Generally, in these embodiments, the database system 105 is implemented on a cluster of multiple computing nodes each with their own processor or set of processors and their own data storage device for storing a portion ("shard") of the database 107. For example, each node may be a computer system in which the hardware components of the computer system are implemented with relatively inexpensive commodity hardware. Each computing node in the cluster executes at least one instance of the database management system 106 and each instance may execute and operate independently or semi-independently of other instances.

The database 107 may be partitioned into shards that are distributed among the nodes, each node storing a portion ("shard") of the database 107.

The database 107 may be replicated such that some or the entire database 107 is duplicated among multiple shards.

The database management system 106 instances distributed across the nodes may use an instance-to-instance coordination protocol for co-coordinating database activities (e.g., database read and write requests) among the instances.

Multi-Row Transactions

As mentioned, the transaction orchestrator 102 provides to the client application 101 cross-row ACID-compliant transactions with snapshot-isolation semantics. The client application 101 may be written in an imperative programming language such as, for example, C, C++, Java, Python, Ruby, VB.NET, C#, etc. Transaction code of the client application 101 may be mixed with calls to the transaction orchestrator 102 application programming interface (API).

Figure 2:
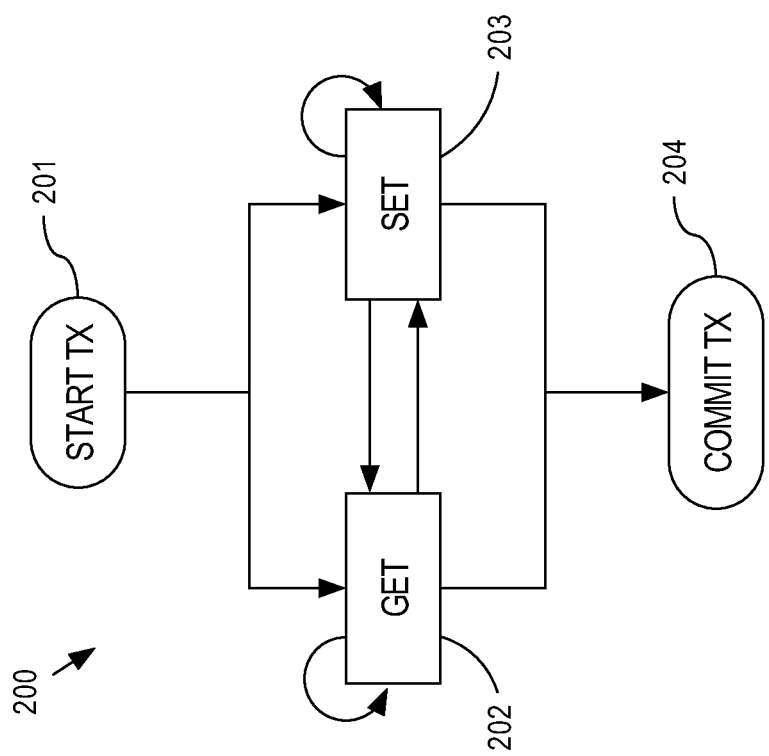
FIG. 2 is a flowchart of a multi-row transaction, in accordance with some embodiments of the present invention.

According to some embodiments, the transaction orchestrator 102 provides through its API to the client application 102 a set of transaction primitives by which the client application 101 can carry out a multi-row transaction. FIG. 2 is a flowchart of a multi-row transaction 200 that may be carried out by the client application 101 according to some embodiments of the invention. Each block 201-204 of the transaction 200 corresponds to one of four transaction primitives supported by the transaction orchestrator 102. In some embodiments, the transaction 200 is executed in the context of a single thread of the client application 101. Parallelism within the client application 101 may be achieved by executing many transactions 200 simultaneously in multiple separate threads of execution.

As shown in FIG. 2, the transaction orchestrator 102 supports at least four transaction primitives: START TX, GET, SET, and COMMIT TX. Discussion of the implementation details of each of the four primitives by the transaction orchestrator 102 is provided below. For now, a multi-row transaction will be described from the perspective of the client application 101.

Initially, to start a multi-row transaction 200, the client application 101 invokes the START TX primitive 201. The START TX primitive 201 returns or outputs to the client application 101 a programmatic handle by which the client application 101 can encapsulate zero or more GET primitives 202 (i.e., row reads) and/or zero or more SET primitives 203 (i.e., row writes) in an atomic multi-row transaction 200.

A GET primitive 202 (i.e., a row read) takes as input from the client application 101 an identifier of a row in the database 107 from which a value is to be read by the transaction orchestrator 102. For example, the identifier may include an identifier of a table in the database 107 and the key of the row in the table. As output, the GET primitive 202 provides the requested value in that row that existed at the time the encapsulating transaction 200 was started. This time is set by when the START TX primitive 201 is invoked for the encapsulating transaction 200. The GET primitive 202 may also accept as additional input an identifier of a column of the identified row. The output that is provided in this case is the value in the given column of the row (cell) at the time the encapsulating transaction 200 was started. Again, this time is set by when the START TX primitive 201 is invoked for the encapsulating transaction 200.

In some embodiments, the GET primitive 202 can operate in a batched mode in which multiple keys are input by the client application 101 to a single GET primitive 202 invocation. In the batched mode of operation, the transaction orchestrator 102 obtains values for the multiple keys from the database system 105 in one or a small number of calls to the database management system 106. Batched mode operation provides improved read performance to the client application 101 when compared to invoking the GET primitive 202 once for each of the multiple keys because fewer network round trips between the transaction orchestrator 102 and the database system 105 are needed to obtain values for the multiple keys.

In some embodiments, the GET primitive 202 is a blocking call from the perspective of the client application 101. That is, after the client application 101 invokes the GET primitive 202, execution control does not return to the client application 101 until after the transaction orchestrator 102 has determined whether the requested value exists in the database 107 or an error occurs. If the requested value was not available in the database 107 or an error occurred, the GET primitive 202 may indicate so by, for example, returning false or other value to the client application 101 that indicates that the read request was not successful.

A SET primitive 203 (i.e., a row write) takes as input from the client application 101 an identifier of a row in the database 107 to which a value is to be written. For example, the identifier may include an identifier of a table in the database 107 and the key of the row in the table. Additionally, the SET primitive 203 accepts as input the value to be written. The client application 101 may also specify as input to the SET primitive 204 a particular column of the row (cell) to which the provided value is to be written.

In some embodiments, invocations of the SET primitive 203 within the context of a transaction 200 are buffered by the transaction orchestrator 102 until commit time. In general, the approach for committing buffered writes is two-phase commit, which is coordinated by the client application 101. Implementation details of the two-phase commit process by the transaction orchestrator 102 are described in greater detail below.

In some embodiments, in response to a GET primitive 202 invocation, the transaction orchestrator 102 returns to the client application 101 a value buffered by the transaction orchestrator 102 for a previous SET primitive 203 invocation instead of a value obtained from the database system 105. For example, if the client application 101 invokes within the context of a transaction 200 a SET primitive 202 to write the value ('1234') in row ('abc'), a subsequent GET primitive 202 invocation within the context of the transaction 200 to read the value in row ('abc') may return the value ('1234') buffered by the transaction orchestrator 102 instead of whatever value for row ('abc') currently exists in the database 107.

A number of GET primitives 202 and/or SET primitives 203 may be encapsulated within the transaction 200 by the client application 101. When the client application 101 is ready to commit, the client application 101 invokes the COMMIT TX primitive 204. As output, the COMMIT TX primitive 204 indicates whether the commit operation was successful. In particular, the output indicates whether all the values to be written to the database 107 and passed as input to the encapsulated SET primitives 203 were committed to the database 107, in which case the transaction 200 was successful, or whether none of the values to be written to the database 107 and were committed to the database 107, in which case the transaction 200 was unsuccessful. The transaction orchestrator 102 ensures that all SET primitives 203 encapsulated by the transaction 200 are atomic with respect to committing the writes of the encapsulated SET primitives 203 to the database 107. In other words, the transaction orchestrator 102 ensures that either all the writes are committed to the database 107 or that none of them are committed.

In some embodiments, to abort a started transaction the client application 101 simply does not invoke the COMMIT TX primitive 204 for the transaction. Aborting a transaction in this way does not affect the ACID compliance and snapshot isolation guarantees provided by the transaction orchestrator 102 for the aborted transaction or for other transactions.

In some embodiments, the transaction orchestrator 102 supports a GET RANGE primitive. The GET RANGE primitive operates similar to the GET primitive expect that instead of accepting as input a single key or multiple keys, the GET RANGE primitive accepts a range of keys as input. The GET RANGE primitive returns a programmatic iterator object that allows the client application 101 to iterate over the one or more values within the specified range.

Example Multi-Row Transaction

The following is example pseudo-programming language code of a hypothetical client application 101 that uses a transaction orchestrator 102 API to conduct a multi-row transaction in accordance with some embodiments of the invention. In this example, a transaction that spans multiple rows of the database 107 is required, rather than just a single-row transaction that the underlying database system 105 might already provide. At line 2, the START TX primitive 201 is invoked and the client application 101 obtains a programmatic handle to the transaction in the form of a reference to a ("Transaction") object. At line 3, the SET primitive 203 is invoked in the context of the current transaction represented by programmatic handle ("tx") to set the value of the ("column1") column of row ("key1") in table ("table1") in the database 107 to ("value1"). This SET primitive 202 at line 3 is buffered by the transaction orchestrator 102 until the COMMIT TX 204 primitive is invoked at line 8. At line 5, the GET primitive 202 is invoked to obtain the value of the ("column2") column of row ("key2") in table ("table2") in the database 107 and assign it to the local ("String") type variable ("var2"). The GET primitive 202 at line 5 returns true if the requested value was successfully obtained by the transaction orchestrator 102 from the database 107, false otherwise. At line 6, the SET primitive 203 is invoked to set the value of the ("column2") column of row ("key2") in table ("table2") to ("key1"). Again, this SET primitive 203 at line 6 is buffered by the transaction orchestrator 102 until the COMMIT TX 204 primitive is invoked at line 8. If, at line 8, the COMMIT TX primitive 204 returns false, then the transaction has conflicted with another transaction or was otherwise unsuccessful in which case neither of the SET primitives 203 at lines 3 and 6 will have been committed to the database 107.

```
1:    bool MyTransaction( ) {
2:        Transaction &tx = StartTransaction( );
3:        tx.set("key1", "column1", "table1", "value1");
4:        String var2;
5:        if (!tx.get("key2", "column2", "table2", &var2)) {
6:            tx.set("key2", "column2", "table2", "key1");
7:        }
8:        return tx.commit( );
9:    }
```

Snapshot Isolation

According to some embodiments, the transaction orchestrator 102 stores in the database 107 multiple versions of each database value using a timestamp dimension in order to provide snapshot isolation to client applications 101. This time stamping scheme is represented in FIG. 3 by an example.

In FIG. 3, two rows of the database 107 are shown, one having a key of ("Alice") and the other having a key of ("Bob"). Both rows have two columns: ("Primary Contact #") and ("Bank Balance"). Each cell (i.e., row/column pair) of the two rows has one or more time stamped database values. For example, at timestamp 3, the values ("(555) 552-7789") and ("$3") were written to the ("Primary Contact #") and ("Bank Balance") columns of the ("Bob") row respectively. Sometime later, at timestamp 5, the values ("(555) 233-1277") and ("$12") were written to the ("Primary Contact #") and ("Bank Balance") columns of the ("Alice") row. Sometime later still, at timestamp 7, the value ("$2") was written to the ("Bank Balance") column of the ("Alice") row. Also at timestamp 7, the value ("$13") was written to the ("Bank Balance") column of the ("Bob") row. Thus, the most recently written versions of the values of the ("Primary Contact #") and ("Bank Balance") columns of the ("Alice") row are ("(555) 233-1277") and ("$2") respectively. And the most recently written versions of the values the ("Primary Contact #") and ("Bank Balance") columns of the ("Bob") row are ("(555) 552-7789") and ("$13") respectively.

As explained in greater detail below, when a client application 101 invokes the GET primitive 202 in the context of a transaction 200, the value that is returned by the transaction orchestrator 102 depends on when the transaction 200 was started by the client application 101. In other words, the time at which the transaction 200 is started determines the snapshot of the database 107 that the client application 101 "sees" when it invokes the GET primitives 202 in the context of the transaction 200. In particular, when START TX primitive 201 is invoked by the client application 101, the transaction orchestrator 102 contacts the timestamp service 104 to obtain a start transaction timestamp. When a GET primitive 202 is invoked in the context of the transaction, the start transaction timestamp determines the version of the requested database value that is fetched from the database 107 by the transaction orchestrator 102. In particular, the transaction orchestrator 102 returns the version of the requested value that has been committed and that has the latest timestamp not later than the start transaction timestamp. For example, if a client application 101 accessing the database rows of FIG. 3 started a transaction at timestamp 9, then a GET of the value in the ("Primary Contact #") column of the ("Alice") row would return the value at timestamp 5, or ("(555) 233-1277"), assuming that value has been committed to the database 107. Similarly, a GET of the value in the ("Primary Contact #") column of the ("Bob") row would return the value timestamp 3, or ("(555) 552-7789"), assuming that value has been committed to the database 107.

As will be explained in greater detail below in conjunction with discussion of the write and read transaction protocol, a value can be written to the database but not committed. Thus, the timestamp associated with a particular database value in the database 107 (e.g., timestamp 7 with the value ("$2") in the ("Bank Balance") column of the ("Alice") row) indicates when the associated database value was written to the database 107 by a multi-row transaction but does not indicate by itself whether the value was actually committed to the database 107. The database value may not have been committed to the database 107 if the transaction is still pending, failed, was aborted, or conflicted with another transaction.

Timestamp Service

According to some embodiments, the timestamp service 104 is a server computing process or set of processes that provides timestamps to the transaction orchestrator 102 in strictly increasing order. The timestamp service 104 may maintain a numerical counter. Each time the transaction orchestrator 102 requests a timestamp, the timestamp service 104 increments the counter by a fixed amount (e.g., one) and returns the value of the counter to the transaction orchestrator 102 after the increment.

As a scalability optimization, the timestamp service 104 may periodically allocate a range of timestamps by writing the highest allocated timestamp of the range to a non-volatile storage. Timestamps in the allocated range can then be handed out to the transaction orchestrator 102 more efficiently from volatile memory. If the timestamp service 104 fails or restarts, the timestamp service 104 jumps forward to the previously stored highest allocated timestamp but will not go backwards.

In one embodiment, as another scalability optimization, requests for timestamps from clients of the timestamp service 104 are batched together at the client such that any given client does not send more than a certain number of requests per period of time to the timestamp service 104 so as to avoid overloading the timestamp service 104 with requests.

Lightweight in-Memory Leased-Based Lock Service

According to some embodiments, the lock service 103 is a server computing process or set of processes that provides lock services to the transaction orchestrator 102. In particular, the lock service 103 provides a network interface by which the transaction orchestrator 102 can request at least four lock operations: acquire lock, release lock, refresh lock, and validate lock. The transaction orchestrator 102 may use the lock service 103 to acquire, release, refresh, and validate locks on database 107 rows.

In operation, the lock service 103 creates and maintains lease records in volatile memory where the lease records can be more quickly accessed and manipulated. Volatile memory may include any non-volatile memory used to implement virtual memory. A lease record represents either a currently held lock or an expired lock on a row of the database 107.

Example Lease Record

Figure 8:
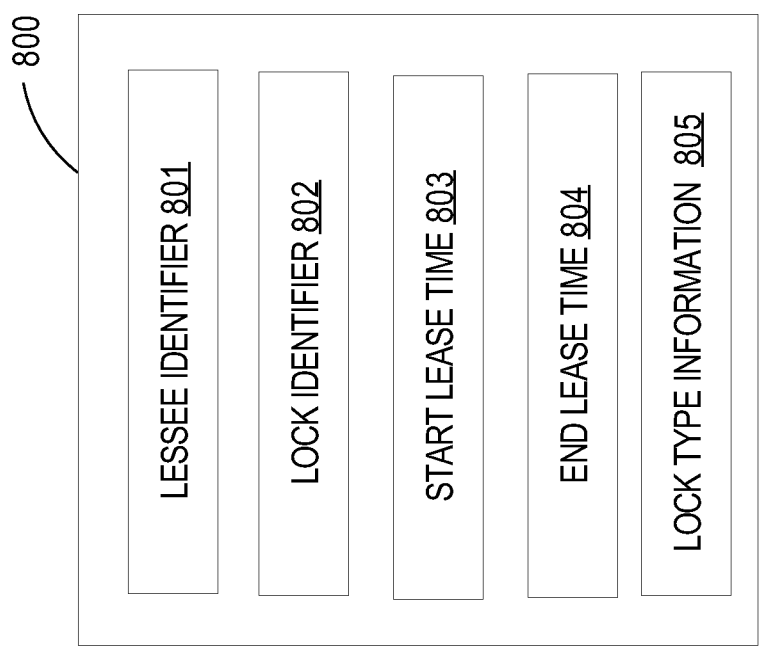
FIG. 8 illustrates a lease record of a lock service, in accordance with some embodiments of the present invention.

FIG. 8 is a block diagram of a lease record 800 that may be created and maintained in a volatile memory by the lock service 103, according to some embodiments of the invention. As shown, lease record 800 comprises a lessee identifier 801, a lock identifier 802, a start lease time 803, an end lease time 804, and lock type information 805.

The lessee identifier 801 identifies the lessee to which the lock represented by the record 800 is or was leased to. In some embodiments, the lessees are transactions conducted by the transaction orchestrator 102 and the lessee identifier 801 of a lease record 800 includes the start transaction timestamp of the transaction to which the lock represented by the record 800 is or was leased to.

The lock identifier 802 identifies the entity or thing that is or was locked. The lock identifier 802 may be a character byte sequence that uniquely identifies the entity or thing that is or was locked. In some embodiments, the lock identifier 802 of a lease record 800 uniquely identifies a row of the database 107 that is or was locked by a transaction. In some embodiments, the lock identifier 802 is a character byte sequence of the form ("<table name>:<row key>") where <table name> is the name of the database 107 table that contains the row and <row key> is the key of the row in that table. The lock identifier 802 may be formatted otherwise and embodiments are not limited to any particular format so long as the row is uniquely identified within the database 107.

The start lease time 803 indicates the time that the lease on the lock was granted to the lessee.

The end lease time 804 indicates the time that the lease on the lock expires or expired. The end lease time 804 may be updated by the lessee by a refresh lock operation while the lease is active.

The lock type information 805 may contain other record keeping information. For example, the lock type information 805 may indicate whether the lessee acquire a read lock or a write lock.

In some embodiments, the lock service 103 indexes the lease records 800 stored in volatile memory by their lock identifiers 802 for efficient access and retrieval. A hash table, associative array, or other suitable indexing data structure may be used for this purpose.

Acquire Lock Operation

For the acquire lock operation, the transaction orchestrator 102 provides a row identifier that uniquely identifies the particular row of the database 107 to be locked and a transaction identifier that identifies the transaction for which the lock is being requested.

In response to receiving the acquire lock request from the transaction orchestrator 102, another transaction may currently hold a lock on the requested row. This may be indicated by an existing lease record 800 for the row that has a lessee identifier 801 different from the one provided in the acquire lock request and that has not yet expired. The lock service 103 can determine whether a lease record has expired by obtaining a current time and determining whether the current time is before the end lease time 804 of the record 800.

In some embodiments, the current time is obtained by the lock service 103 from a clock of the lock service 103 such as, for example, a clock maintained by the operating system on which the lock service 103 executes. If the current time is before the end lease time 804, then the lock service 103 informs the transaction orchestrator 102 that the acquire lock operation failed.

If another transaction does not currently hold a lock on the requested row, then the lock service 103 may create a new lease record 800 for the row or reuse the expired lease record 800 for the row. Where a new lease record 800 is created, the lock identifier 802 of the lease record 800 is set to the row identifier provided by the transaction orchestrator 102. In both cases where a new lease record 800 is created or an existing record 800 is re-used, the lessee identifier 801 of the lease record 800 for the particular row may be set to include the transaction identifier provided by the transaction orchestrator 102.

In addition, the start lease time 803 of the record is set to a current time obtained by the lock service 103. The end lease time 804 of the record 800 is determined by adding a fixed time amount to the start lease time 803. The fixed time amount represents the length of the lease (e.g., thirty seconds).

In some embodiments, the fixed time amount is a configuration parameter of the lock service 103. The lock service 103 then indicates to the transaction orchestrator 102 that the lock on the row was successfully obtained.

Read and Write Row Locks

In some embodiments, one of two different types of locks can be acquired on a row through the acquire lock operation. A first type is referred to herein as a "read" lock and a second type is referred to herein as a "write" lock. The semantics of read lock and the write lock are enforced by the lock service 103. In particular, a transaction can acquire a read lock on a row if no other transaction currently holds a write lock on the row. A transaction can acquire a write lock on a row if no other transaction currently holds a read lock or a write lock on the row. Thus, multiple transactions may concurrently hold a read lock on a row. But only one transaction can hold a write lock on a row at a time and while that transaction holds the write lock on the row no other transactions can acquire a read lock or a write lock on that row. A transaction no longer holds a lock on a row when the lease on the lock expires or the lock is expressly released through a release lock operation.

Release Lock Operation

For the release lock operation, the transaction orchestrator 102 provides a row identifier that identifies the locked row to be released and a transaction identifier identifying the transaction that currently holds the lock on the row.

In response to receiving the release lock request from the transaction orchestrator 102, the lock service 103 may invoke the validate lock operation (discussed below) to ensure that the transaction requesting to release the lock on the row acquired the lock on the row and currently holds the lock on the row. If the transaction acquired and currently holds the lock on the row, the lock service 103 updates the lease record 800 for the row to indicate that the current lease has expired. For example, the lock service 103 may set to the end lease time 804 to a current time or a time in the past.

Refresh Lock Operation

For the refresh lock operation, the transaction orchestrator 102 provides a row identifier that identifies the locked row to be refreshed and a transaction identifier identifying the transaction that currently holds the lock on the row.

In response to receiving the refresh lock request from the transaction orchestrator 102, the lock service 103 may invoke the validate lock operation (discussed below) to ensure that the transaction requesting to refresh the lock on the row acquired the lock on the row and currently holds the lock on the row. If the transaction acquired and currently holds the lock on the row, the lock service 103 may update the end lease time 804 field of the lease record 800 for the row to extend the time of the lease. For example, the lock service 103 may add a fixed time amount to the current end lease time 804 to produce a new end lease time 804 that is then written to the lease record 800.

Validate Lock Operation

The validate lock operation may be used to determine whether a specified transaction acquired a lock on a specified row and still currently holds that lock on the specified row. For the validate lock operation, the transaction orchestrator 102 provides a row identifier that identifies the locked row to be validated and a transaction identifier identifying the transaction that purportedly still holds the lock on the row. The lock service 103 may also invoke the validate lock operation internally as part of handling a release lock or refresh lock request.

In response to receiving a validate lock request, the lock service 103 obtains the lease record 800 for the specified row. If a lease record 800 for the specified row does not exist, then the lock is not validated. If a lease record 800 for the row does exist, then the lessee identifier 801 of the lease record 800 is compared to the specified transaction. A current time obtained by the lock service 103 is compared to the end lease time 804. If the lessee identifier 801 matches or includes the specified transaction and the current time is less than the end lease time 804, then the lock is validated. Otherwise, the lock is not validated.

Transaction Table

According to some embodiments, the transaction orchestrator 102 maintains in the database 107 a transaction table for tracking multi-row transactions and for providing ACID-compliant multi-row transactions with proper snapshot isolation semantics to the client application 101. In particular, the transaction table contains at most one row per transaction. A transaction's row in the transaction table, if one exists, is keyed by the start transaction timestamp of the transaction. The row has at least one column whose value is a commit timestamp for the transaction, if the transaction was successfully committed. If the transaction has been explicitly failed, then the value in the one column is an invalid commit timestamp (e.g., $-1$).

When the client application 101 invokes the START TX primitive 201, the transaction orchestrator 102, in response, obtains a timestamp from the timestamp service 104 that is the start transaction timestamp for the transaction. Since timestamp service 104 provides timestamps in a strictly increasing order, no two transactions should be associated with the same start transaction timestamp.

When the client application 101 invokes the COMMIT TX primitive 204 for the transaction, the transaction orchestrator 102, in response and assuming the transaction can be successfully committed, obtains another timestamp from the timestamp service 104 that is the commit timestamp for the transaction. By the strictly increasing order property of the timestamps provided by the timestamp service 104, the commit timestamp of the transaction should be later than the start transaction timestamp of the transaction.

In response to receiving the commit timestamp from the timestamp service 104, the transaction orchestrator 102 may attempt to write a row to the transaction table with a key equal to the start transaction timestamp and a value containing the commit timestamp. In some embodiments, this write attempt is a "put if absent" operation. That is, the write succeeds only if a row keyed by start transaction timestamp does not already exist in the transaction table. If the row already exists, then the write fails. In some embodiments, the put if absent operation is an atomic operation provided and carried out by the database management system 106.

As described in greater detail below with respect to the read and write transaction protocol, the transaction table may be used to coordinate multi-row transactions and ensure proper snapshot isolation semantics. For example, before a particular time stamped value is returned in response to a GET primitive 202 or other read primitive from the client application 101, the transaction orchestrator 102 consults the transaction table to make sure the transaction that wrote the time stamped value was actually committed.

Example Transaction Table

Figure 4:
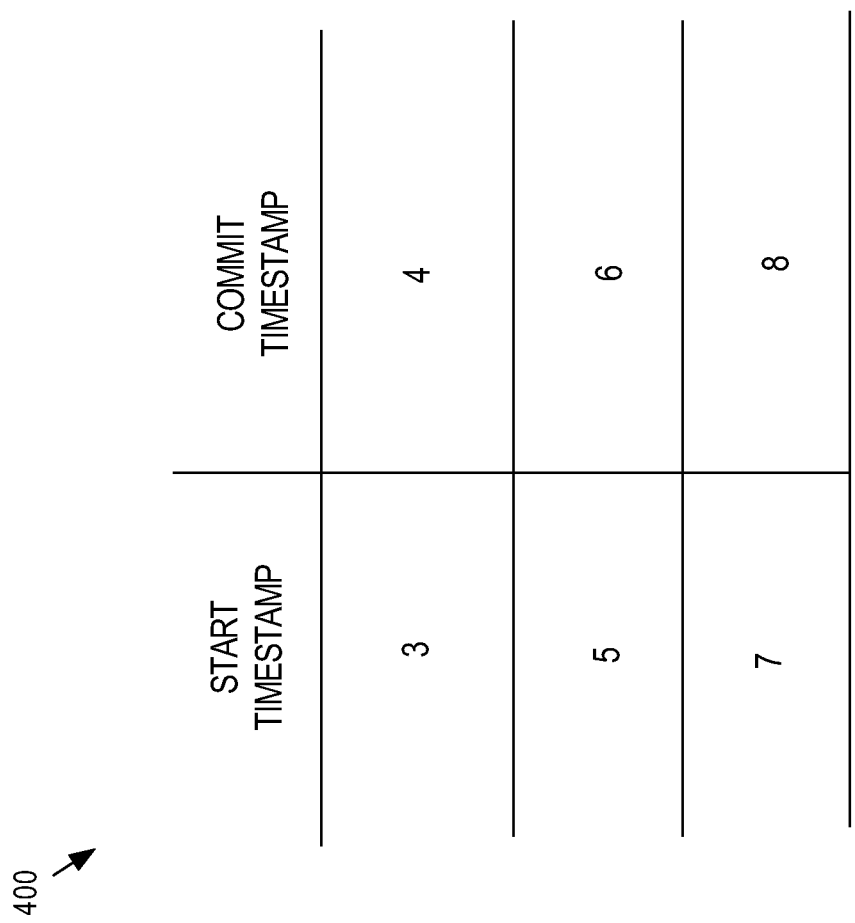
FIG. 4 illustrates a transaction table, in accordance with some embodiments of the present invention.

FIG. 4 illustrates an example transaction table 400 for three transactions that wrote the database values to the rows shown in FIG. 3. The example of FIG. 4 assumes that all three transactions were successfully committed. As shown, the transaction that wrote the values at timestamp 3 in the ("Bob") row was committed at timestamp 4. The transaction that wrote the values at timestamp 5 in the ("Alice") row was committed at timestamp 6. The transaction that wrote the values at timestamp 7 in the ("Bob") and ("Alice") rows was committed at timestamp 8.

In embodiments where the database system 105 is configured in a shared nothing architecture, the transaction table can be distributed, sharded, and replicated.

Write Transaction Protocol

Figure 5:
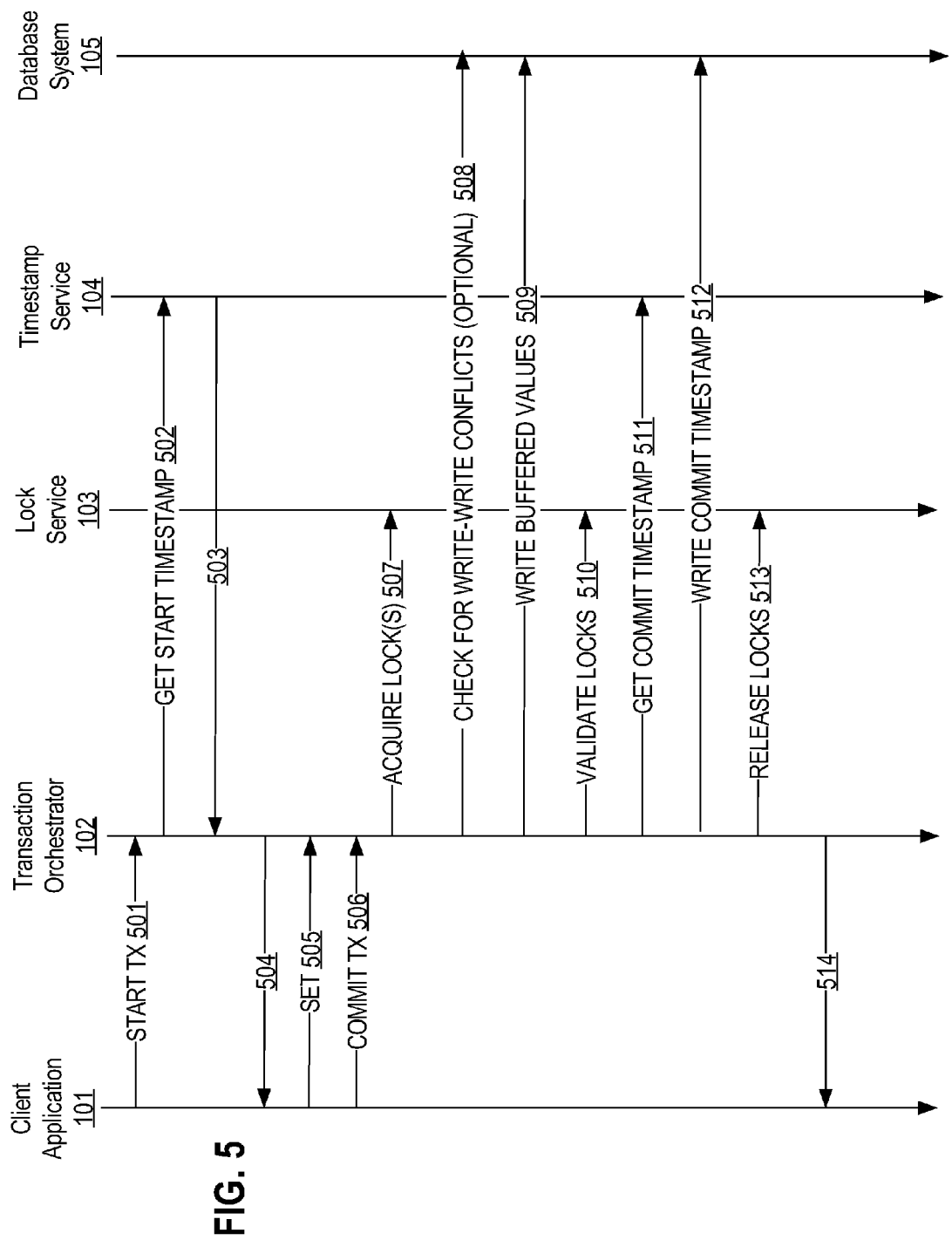
FIG. 5 illustrates interaction between components in carrying out a write transaction protocol, in accordance with some embodiments of the present invention.

FIG. 5 is a flow diagram illustrating interaction between the components of system 100 of FIG. 1 in carrying out a write transaction protocol according to some embodiments of the invention.

The write transaction protocol will be explained in part by continuing the example of FIG. 3. In particular, assume a multi-row transaction of the client application 101 for transferring $10 from Bob to Alice is started at timestamp 9. In this example, FIG. 3 reflects the state of the ("Alice") and ("Bob") rows in the database 107 before the rows have been written to reflect the transfer of the $10. FIG. 6 illustrates the state of the ("Alice") and ("Bob") rows after $10 has been subtracted from Bob's account and added to Alice's account.

Turning now to the write transaction protocol, at 501, the client application 101 invokes the START TX primitive 201 of the transaction orchestrator 102 to start a transaction. This causes the transaction orchestrator at 502 to message the timestamp service 104 to obtain a start transaction timestamp from the timestamp service 104 for the current transaction. As mentioned previously, the start transaction timestamp determines the consistent snapshot of the database 107 seen by any GET primitives 202 invoked by the client application 101 in the context of the current transaction. A start transaction timestamp is returned to the transaction orchestrator 102 at 503.

A handle to the transaction by which the client application 101 can encapsulate GET primitives 202 and SET primitives 203 and other read and write primitives in the transaction and commit the transaction is returned to the client application 101 at 504.

At 505, one or more SET primitives 203 are invoked. Each SET primitive 203 is buffered by the transaction orchestrator 102 until commit time.

Assume for the purposes of the current example in which $10 is be transferred from Bob to Alice that the client application 101 reads from the database 107, through two GET primitives 202 in the context of the current transaction, the current bank balances of Alice and Bob, which prior to the start timestamp for the current transaction (in this example, 9) is $13 for Bob (timestamp 7) and $2 for Alice (timestamp 7). The read protocol is explained in greater detail below. Further assume, the client application 101 then invokes a SET primitive 203 to write the value ("$3") in the ("Bank Balance") column of the ("Bob") row reflecting that $10 is to be withdrawn from Bob's account and invokes another SET primitive 203 to write the value ("$12") in the ("Bank Balance") column of the ("Alice") row reflecting that $10 is to be added to Alice's account.

At this point, the row writes of the SET primitives 203 buffered by the transaction orchestrator 102 have not yet been committed to the database 107. To attempt to do so, the client application at 506 may invoke the COMMIT TX 204 primitive to commit the buffered writes to the database 107. As mentioned previously, the transaction orchestrator 102 uses a two-phased approach for committing buffered writes.

First Commit Phase

In the first commit phase, the transaction orchestrator 102 initially attempts to obtain from the lock service 103 a write lock on the current transaction's row of the transaction table. This row may not actually exist in the transaction table before the current transaction is successfully committed. The transaction orchestrator 102 may still acquire a write lock on the row by providing a row identifier to the lock service 103 in an acquire lock operation.

In some embodiments, the row identifier provided to the lock service 103 contains the start transaction timestamp of the current transaction. If and when the current transaction is successfully committed, the current transaction's row will be written to the transaction table and the write lock on the row released.

As described in greater detail below with respect to the read transaction protocol, the write lock on the current transaction's row of the transaction table ensures that other transactions do not read values written to the transaction table by the current transaction before the current transaction has been committed.

The transaction orchestrator 102 does not proceed with the remainder of the first commit phase until the write lock on the current transaction's row in the transaction table can be acquired.

In some embodiments of the first commit phase, the transaction orchestrator 102 optionally checks for write-write conflicts. As explained in greater detail below, this check involves the transaction orchestrator 102 attempting to obtain write locks on all of the database 107 data rows to be written by the current transaction. These are the rows to be written by the SET primitives 203 buffered by the transaction orchestrator 102 for the current transaction.

In one embodiment, if any one of these rows cannot be write locked because another transaction currently holds a lock on one of the rows, the transaction orchestrator 102 does not proceed with the remainder of the write-write conflict check until all of the these rows can be write locked.

Once write locks on all of these rows are obtained, the transaction orchestrator 102 then reads from the database 107 the time stamps of the latest time stamped values in the database 107 data cells to be written by the current transaction. For each such time stamp, the transaction orchestrator 102 consults the transaction table in the database 107 to determine whether the transaction that wrote the time stamped value committed that time stamped value after the start transaction timestamp of the current transaction. If so, then a write-write conflict is detected and the transaction orchestrator 102 aborts the current transaction and notifies the client application 101.

After acquiring a write lock on the current transaction's row of the transaction table, if there are no write-write conflicts detected or if a write-write conflict check was not performed, then the transaction orchestrator 102 proceeds to write the buffered row writes to the database 107.

After the buffered row writes are written to the database 107, the transaction orchestrator 102 queries the lock service 103 to validate the row locks obtained by the current transaction at the start of the first commit phase of the current transaction including the write lock acquired on the current transaction's row of the transaction table and any write locks acquired on written data rows for the write-write conflict check. This validation involves querying the lock service 103 to determine whether the acquired row locks have been held by the current transaction since they were obtained including while the write-write conflict check was performed, if it was performed, and while the buffered row writes were written to the database 107. If the locks cannot be validated, the transaction orchestrator 102 aborts the current transaction and notifies the client application 101. If the locks are validated, then the transaction orchestrator 102 proceeds to the second phase of the commit process. The second commit phase is described in greater detail below. Steps of the first commit phase will now be described in greater detail.

Acquire Lock(s)

At 507, the transaction orchestrator 102 attempts to acquire from the lock service 103 a write lock on the current transaction's row of the transaction table.

Write Lock on Current Transaction's Row of the Transaction Table

In one embodiment, the transaction orchestrator 102 sends an acquire lock request to the lock service 103 requesting a write lock on the current transaction's row of the transaction table. For example, the row identifier in the acquire lock request may be of the form ('<table id>:<start transaction timestamp>'), where <table_id> is the identifier of the transaction table and <start transaction timestamp> is the start transaction timestamp of the current transaction obtained at step 503.

As mentioned, this row many not actually exist in the transaction table of the database 107 when the transaction orchestrator 102 makes this request.

Write Locks on Data Rows to be Written by Current Transaction

Optionally, if write-write conflict detection is being performed for the current transaction, the transaction orchestrator 102 also attempts to acquire from the lock service 103 a write lock on each data row to be written by the SET primitives 203 encapsulated by the current transaction.

In the current example, if a write-write conflict check is being performed, the transaction orchestrator 102 would attempt to acquire a write lock from the lock service 103 on the ("Alice") row and a write lock on the ("Bob") row. If any one of the write locks on the row or rows to be written cannot be acquired, for example, because another transaction currently holds one of the locks, then the transaction orchestrator 102 waits until the locks can be acquired before proceeding with the remainder of the write-write conflict check.

In some embodiments, the transaction orchestrator 102 avoids deadlocks by acquiring write locks on the rows to be written according to a total ordering of the locks to be acquired. The total ordering is defined over identifiers of the locks to be acquired according to a lexical ordering. In particular, before the transaction orchestrator 102 attempts to acquire write locks on the rows to be written from the lock service 103, the transaction orchestrator 102 generates a lock identifier for each of the rows to be write-locked.

This lock identifier may be a character byte sequence. For example, the lock identifier may be of the form ('<table id>:<row key>'), where <table id> is character byte sequence identifying the table in the database 107 that contains the row with the key <row key>.

Once lock identifiers for all of the rows to be written by the current transaction have been generated, the transaction orchestrator 102 sorts the lock identifiers lexicographically from smallest to largest. The transaction orchestrator 102 then attempts to acquire the write locks on the rows from the lock service 104 in their lexicographically sorted order. If a particular write lock on a row to be written cannot be acquired because another transaction currently holds a lock on the row, the transaction orchestrator 102 waits until the write lock on the row can be acquired. This wait may involve the transaction orchestrator 102 repeatedly attempting to acquire the write lock on a periodic basis. Deadlocks are avoided so long as write locks on the rows to be written by a transaction are acquired according to a total ordering. Further, this total ordering solution does not require a centralized global deadlock detection process that could hinder horizontal scaling of the system.

In some embodiments, the transaction orchestrator 102 at 507 attempts to acquire the write lock on the current transaction's row of the transaction table and all of the write locks on the rows to be written by the current transaction in a single acquire lock request to the lock service 103. In other embodiments, multiple acquire lock requests are made, for example, an acquire lock request per row lock.

Write-Write Conflict Detection

At 508, the transaction orchestrator 102 may optionally check for write-write conflicts with the current transaction. A write-write conflict exists if another transaction committed a database value to a cell (i.e., row/column pair) of the database 107 that is to be written by the current transaction after the start transaction timestamp of the current transaction.

Figure 9:
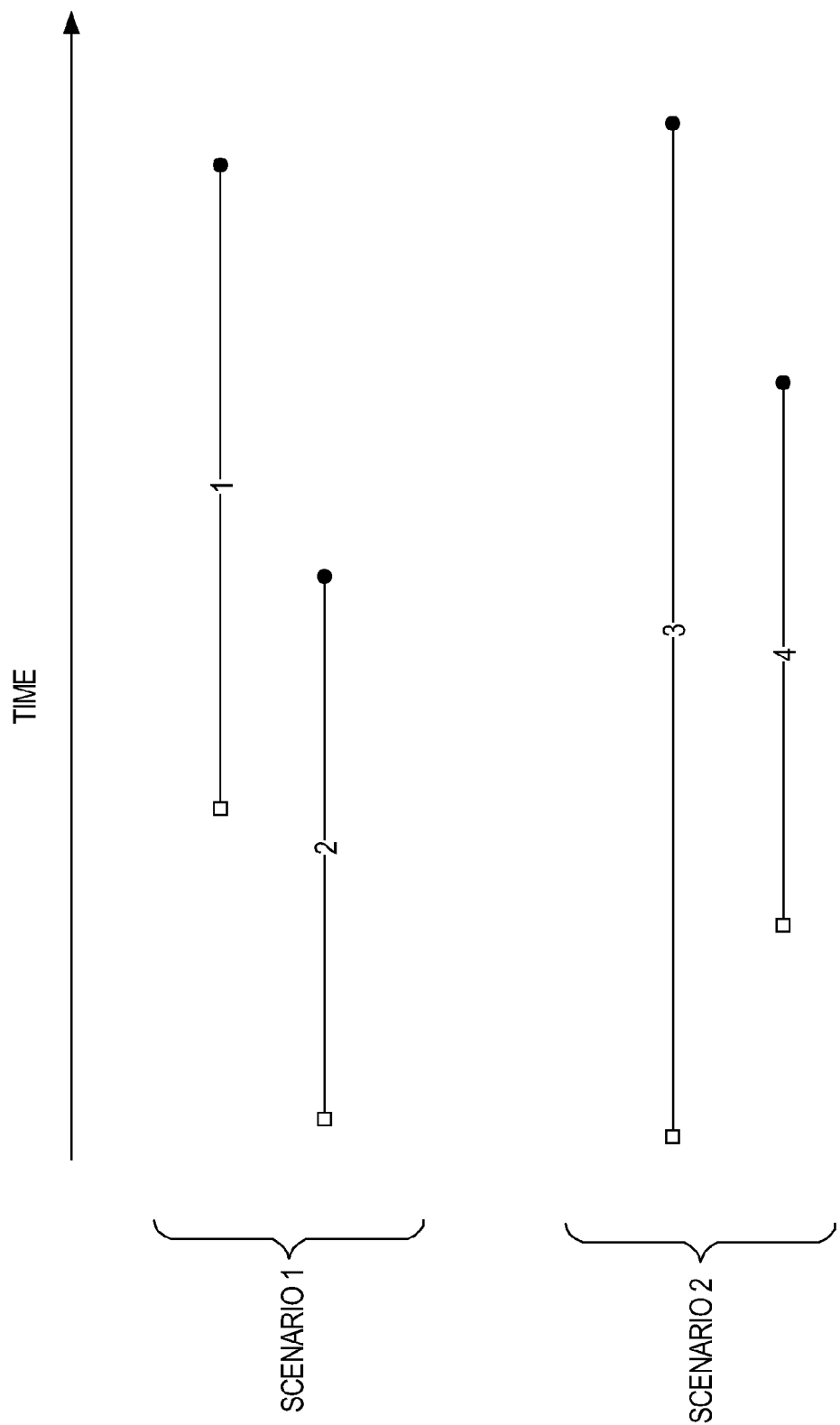
FIG. 9 illustrates two write-write conflict scenarios, in accordance with some embodiments of the present invention.

Two write-write conflict scenarios are depicted in FIG. 9. In Scenario 1, Transaction 2 starts before Transaction 1, but commits during Transaction 1. If both Transaction 1 and Transaction 2 write to the same database 107 cell, then Transaction 1 will be aborted by the transaction orchestrator 102. In Scenario 2, Transaction 4 starts after Transaction 3 and commits during Transaction 3. If both Transaction 3 and Transaction 4 write the same database 107 cell, then Transaction 3 will be aborted by the transaction orchestrator 102.

Returning to FIG. 5, at 508, to detect any write-write conflicts, the transaction orchestrator 102 reads from the database 107 the time stamp of the latest value in each database 107 cell to be written by the current transaction. The latest value in a cell is the value with the latest time stamp.

After obtaining all such time stamps, the transaction orchestrator 102 reads the transaction table to obtain, for each unique one of the obtained time stamps, the value in the commit timestamp column of the row keyed by the time stamp. If the row for the time stamp does not exist in the transaction table, then the transaction that started at the time stamp has not yet committed. If the row exists and the value in the commit timestamp column of the row is an invalid commit timestamp (e.g., −1), then the transaction has been explicitly failed by another transaction. If the row exists and the value in the commit timestamp column of the row is a valid commit timestamp, then the transaction orchestrator 102 compares that commit timestamp to the start transaction timestamp for the current transaction. If the commit timestamp is later than the start transaction timestamp for the current transaction, a write-write conflict has been detected and the transaction orchestrator 102 will abort the current transaction.

For example, assume FIG. 3 reflects the state of the ("Alice") and ("Bob") rows after write locks are acquired on those rows at 507. To detect any write-write conflicts, the transaction orchestrator 102 would read the latest timestamp in each of the database 107 cells to be written by the current transaction. This would result in reading the time stamp ('7') from both the ("Bank Balance") column of the ("Alice") row and the ("Bank Balance") column of the ("Bob") row.

Next, the transaction orchestrator 102 would read the value in the commit timestamp column of the row in the transaction table having a key equal to ('7'). For example, assume FIG. 4 reflects the transaction table when the transaction orchestrator 102 consults the transaction table at 508, the value ('8') would be read as the commit timestamp for the transaction that started at timestamp ('7'). Since this commit timestamp ('8') is earlier that the start transaction timestamp of the current transaction ('9'), the transaction orchestrator 102 would determine that there is no write-write conflict between the transaction that started at timestamp ('7') and the current transaction.

As mentioned, the write-write conflict check at 508 is optional and need not be performed for every transaction. When the transaction orchestrator 102 performs the write-write conflict check at 508, then the transaction orchestrator 102 also acquires at 507 write locks on all the database 107 rows to be written by the current transaction. These write locks are acquired in addition to the write lock on the current transaction's row of the transaction table. If the transaction orchestrator 102 does not perform the write-write conflict check at 508, then the write locks on the rows to be written need not be acquired by the transaction orchestrator 102 at 507. In both cases, when a write-write conflict check is performed and when a write-write conflict check is not performed by the transaction orchestrator 102, the transaction orchestrator 102 acquires at 507 a write lock on the current transaction row's of the transaction table.

In one embodiment, whether the transaction orchestrator 102 performs a write-write conflict check for the current transaction is based on configuration provided to transaction orchestrator 102. In one embodiment, the configuration is provided to the transaction orchestrator 102 by the client application 101, for example, through the programmatic handle returned at 504, for example, as an argument to the COMMIT TX primitive 204 invocation. In one embodiment, the transaction orchestrator 102 is provided or reads from the database 107 a list of database 107 tables. The transaction orchestrator 102 will perform a write-write conflict check for any transaction that writes to one of these tables and will not perform a write-write conflict check for a transaction that does not write to any of the listed tables. Alternatively, the transaction orchestrator 102 is configured by default to perform a write-write conflict check for all transactions except those that write to one the tables in the list. The transaction orchestrator 102 may not perform write-write conflict detection for each and every transaction as a performance optimization.

Explicitly Failing Transactions Pending Commit

As discussed above, to detect write-write conflicts with the current transaction, the transaction orchestrator 102 reads from the database 107 the time stamp of the latest value in each database 107 cell to be written by the current transaction. Next, after obtaining all such time stamps, the transaction orchestrator 102 consults the transaction table to obtain, for each unique one of the obtained time stamps, the value in the commit timestamp column of the row of the transaction table keyed by the time stamp. If the row keyed by the time stamp does not exist in the transaction table, this indicates that the transaction that started at the time stamp has not yet committed and may have failed or been aborted. In this case, the transaction orchestrator 102 may attempt to explicitly fail the transaction pending commit by attempting to write a row to the transaction table keyed by the time stamp and with an invalid commit timestamp value (e.g., −1).

This write attempt is a put if absent operation such that one of, but not both of, the following will occur: (1) the put if absent operation succeeds and the transaction pending commit is explicitly failed, (2) the put if absent operation fails because the transaction pending commit committed in the interim, or (3) the put if absent operation fails because another transaction explicitly failed the transaction pending commit in the interim.

In the case of (1), the transaction orchestrator 102 repeats the write-write conflict detection check to determine if an earlier committed transaction conflicts with the current transaction. When repeating the write-write conflict check, the transaction orchestrator 102 ignores those time stamped values read from the cells during the previous write-write conflict check iteration that were written by the transaction that was explicitly failed during the previous write-write conflict check iteration. Instead, for the subsequent iteration of the write-write conflict check, the transaction orchestrator 102 reads the next latest time stamped values in those cells. The write-write conflict check may be repeated by the transaction orchestrator 102 for the next latest time stamped values in those cells and so on if the previous write check conflict iteration successfully explicitly failed a transaction pending commit.

In the case of (2), the current transaction is aborted by the transaction orchestrator 102 as it conflicts with the now committed transaction that was previously pending commit.

In the case of (3), the put if absent operation failure by the current transaction is ignored as the other transaction successfully explicitly failed the transaction pending commit.

Optionally, in the case of (1) or (3), if the transaction pending commit is successfully explicitly failed, the transaction orchestrator 102 may also delete or remove the time stamped values from the database 107 written to the database cells by the now failed transaction pending commit.

Write Buffered Values

Next, assuming there are no write-write conflicts and the current transaction has not been aborted, the transaction orchestrator 102 at 509 writes the buffered SET primitives 203 to the database 107.

Each value written to the database 107 is time stamped with the start transaction timestamp for the current transaction. For example, FIG. 6 illustrates the state of the ("Alice") and ("Bob") rows after $10 has been subtracted from Bob's account and added to Alice's account. In particular, the value ("$3") is written with time stamp ('9') to the ("Bank Balance") column of the ("Bob") row reflecting that $10 has been subtracted from Bob's account. The value ("$12") is written with time stamp ('9') to the ("Bank Balance") column of the ("Alice") row reflecting that $10 has been added to Alice's account.

Validate Locks

After writing the buffered values to the database 107 rows and before actually committing the current transaction, the transaction orchestrator 102 queries the lock service 103 at 510 to ensure that the locks that were acquired from the lock service 103 at 507 were actually held by the current transaction since they were acquired including during when the write-write conflict check was performed at 508, if it was performed, and during when the buffered writes were written to the database 107 at 509.

In the current example, the transaction orchestrator 102 at 510 would query the lock service 103 to validate that the write lock on the current transaction's row of the transaction table acquired at 507 has been locked by the current transaction since it was acquired at 507. In addition, if the write-write conflict check was performed at 508, the transaction 102 at 510 would also query the lock service 103 to validate that the write lock on the ("Alice") row and the write lock on the ("Bob") row acquired at 507 have been locked by the current transaction since they were acquired at 507. The lock service 103 may validate these locks by checking that lease records 800 for the locked rows exist, identify the current transaction according the lessee identifiers 801, and have not expired according to the end lease times 804.

If the locks acquired at 507 cannot be validated at 510, then the transaction orchestrator 102 aborts the current transaction and notifies the client application 101. Otherwise, the transaction orchestrator 102 proceeds to the second phase of the two-phase commit process.

Second Commit Phase

At the beginning of the second phase, the transaction orchestrator 102 at 511 obtains a commit timestamp for the current transaction from the timestamp service 104. Assume for the current example, that the commit timestamp obtained from the timestamp service 104 is ('10').

Next, the transaction orchestrator 102 performs at 512 the put if absent operation discussed above in an attempt to atomically write a row to the transaction table keyed by the start timestamp for the current transaction and having the commit timestamp obtained as value.

Figure 7:
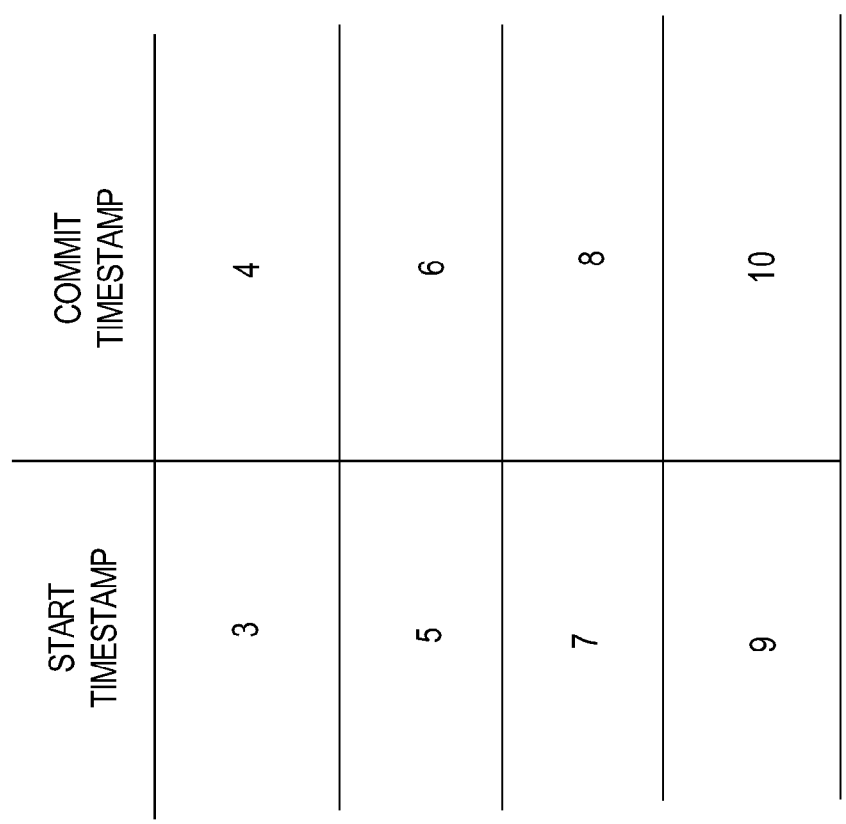
FIG. 7 illustrates an example transaction table, in accordance with some embodiments of the present invention.

In the current example, the transaction orchestrator 102 would attempt to "put if absent" a row keyed by the start transaction timestamp of ('9') with a commit timestamp value of ('10'). This is shown in FIG. 7.

At this point, assuming the put if absent operation at 512 is successful; the current transaction has been committed to the database 107. At 513, the transaction orchestrator 102 performs any cleanup operations include messaging the lock service 103 to release the locks acquired during the first commit phase. If the put if absent operation at 512 failed, then the transaction coordinator aborts the current transaction.

At 514, a success indication may be provided to the client application 101 to indicate that the multi-row transaction was successfully committed.

Read Transaction Protocol

Figure 10:
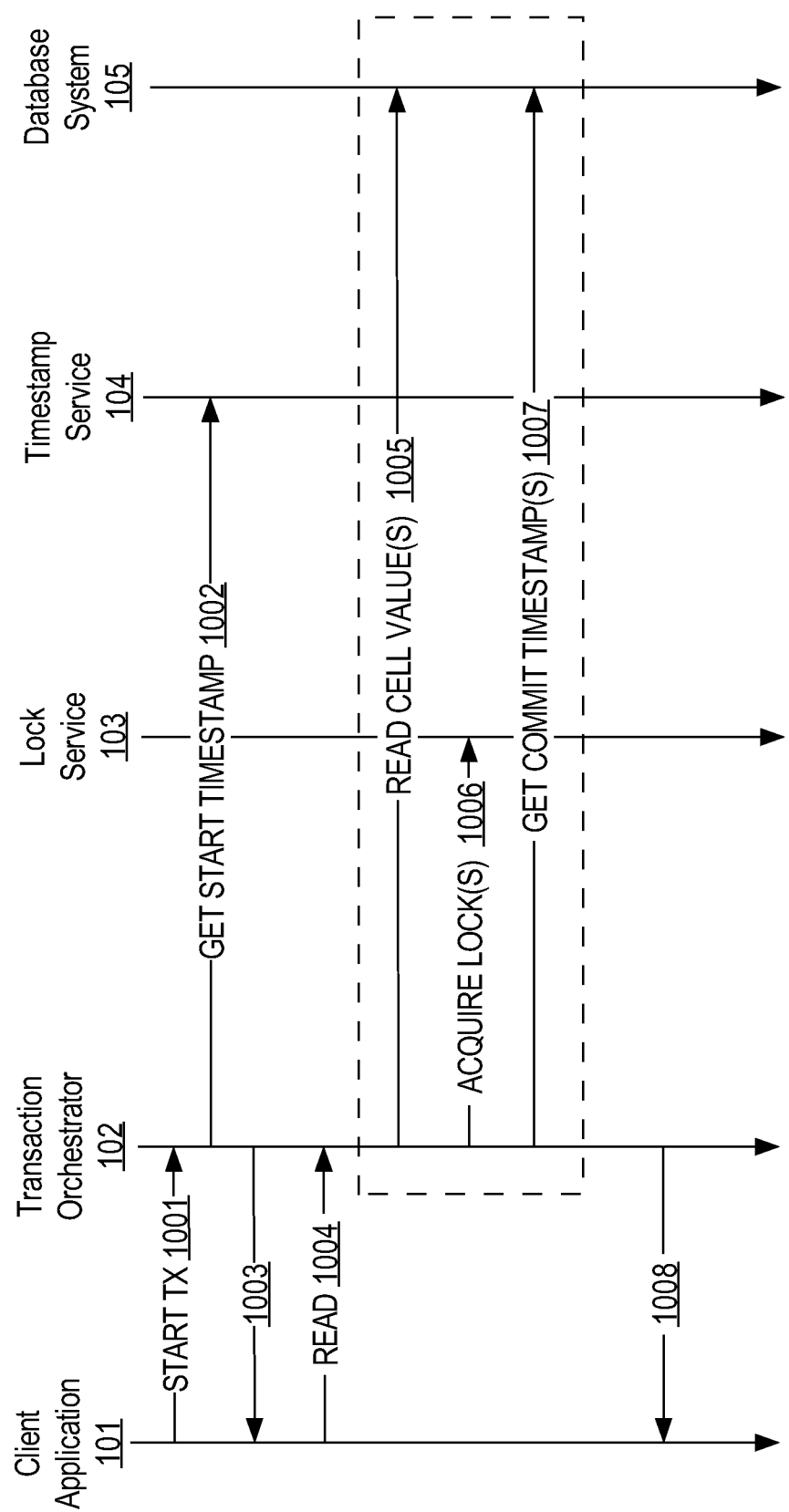
FIG. 10 illustrates interaction between components in carrying out a read transaction protocol, in accordance with some embodiments of the present invention.

FIG. 10 is a flow diagram illustrating interaction between the components of system 100 in carrying out a read transaction protocol according to some embodiments of the invention. For the read transaction protocol, the start transaction timestamp determines the version of the database 107 that encapsulated GET primitives 202 or other read primitives "see" when they are executed by the transaction orchestrator 102 against the database 107. In particular, the transaction orchestrator 102 will not return to the client application 101 any database value that was written by a transaction that started after the current transaction was started. For example, referring to FIG. 6, a GET primitive 202 to read the value in the ("Bank Balance") column of the ("Alice") row in the context of a transaction started at time stamp ('7') would return the value ("$2") and not the later value ("$12") at time stamp ('9'). Further, the transaction orchestrator 102 will not return any database value that has not yet been committed or that was committed after the current transaction was started. For example, referring again to FIG. 6, assume the transaction that wrote the value ("$12") in the ("Bank Balance") column of the ("Alice") row at time stamp ('9') has not yet committed, in this case, a GET primitive 202 to read the value in the ("Bank Balance") column of the ("Alice") row in the context of a transaction started at time stamp 10 would return the value ("$2") at time stamp ('7'). If the transaction that was started at time stamp ('9') commits at time stamp ('11') before the GET primitive 202 to read the value in the ("Bank Balance") column of the ("Alice") row is invoked, the value ("$2'") at time stamp 7 would still be returned by the transaction orchestrator 102 in response to the GET primitive 202 invocation.

Turning now to the read transaction protocol interaction depicted in FIG. 10, at 1001, the client application 101 invokes the START TX primitive 201 of the transaction orchestrator 102. This causes the transaction orchestrator at 1002 to message the timestamp service 104 to obtain a start transaction timestamp from the timestamp service 104. As mentioned previously, the start transaction timestamp determines the consistent snapshot of the database 107 seen by any GET primitives 202 invoked by the client application 101 in the context of the current transaction.

A handle to the transaction by which the client application 101 can encapsulate GET primitives 202 and other read primitives in the transaction is returned to the client application 101 at 1003.

At 1004, a GET primitive 202 is invoked by the client application 101 in the context of the current transaction. The read primitive specifies a database cell (i.e., row/column pair) to read.

In response to the GET primitive 202 invocation, the transaction orchestrator 102 at steps 1005, 1006, and 1007 successively obtains time stamped database values from the requested database 107 cells starting with the latest time stamped database values prior to the start transaction timestamp of the current transaction and proceeding if necessary to the next latest time stamped databases value prior to the start transaction timestamp of the current transaction and so on as necessary until valid time stamped values are obtained for each of the requested cells or it is determined that no valid value exists in a cell. A valid time stamped database value is one that is committed before the start transaction timestamp of the current transaction. If there is no valid time stamped database value in a cell, then it is determined that no valid value exists in the cell in the consistent snapshot of the database 107 corresponding to the start transaction timestamp of the current transaction.

In response to the read primitive invocation, the transaction orchestrator 102 initially associates the database cell to be read with a "snapshot timestamp". Initially the snapshot timestamp associated with each database cell to be read is the start transaction timestamp of the current transaction.

At 1005, the transaction orchestrator 102 reads the latest time stamped database value from the requested database 107 cell. In particular, the transaction orchestrator 102 reads the latest time stamped value in the cell that is time stamped no later than the snapshot timestamp associated with the cell. Step 1005 involves not just reading the latest time stamp database value, but also reading the timestamp associated with the value in the cell. This timestamp may be referred to as the value's "write" timestamp. This write timestamp is the same as the start transaction timestamp of the transaction that wrote the value associated with the write timestamp to the cell. If there is no database value in the cell having a write timestamp equal to or earlier than the snapshot timestamp associated with the cell, then the cell has no value for the snapshot of the database 107 that the current transaction "sees" as dictated by the current transaction's start timestamp. In this case, the transaction orchestrator 102 at 1008 may return an empty value for the cell.

At 1006, the transaction orchestrator 102 attempts to acquire a read lock on the row in the transaction table corresponding to the write timestamp read from the cell at 1005. By attempting to acquire a read lock on the row in the transaction table corresponding to the write timestamp read from the cell at 1005, if the transaction that wrote the value associated with the write timestamp read from a cell at 1005 is currently in the process of committing and currently holds a write lock on the row in the transaction table for the transaction (i.e., the row keyed by the write timestamp), the current transaction will block as necessary until that transaction has either successfully committed or the write lock on the row has timed out. Once the read lock has been successfully acquired by the current transaction, the transaction orchestrator 102 may immediately release the read lock.

At 1007, the transaction orchestrator 102 attempts to read the row in the transaction table corresponding to the write timestamp read from the cell at 1005. The row may not exist, may exist with an invalid commit timestamp (−1), may exist with a commit timestamp greater than the start transaction timestamp of the current transaction, or may exist with a commit timestamp less than the start transaction timestamp of the current transaction.

If the row does not exist in the transaction table, then the transaction that started at the write timestamp has either aborted or timed out. Where the row does not exist, the transaction orchestrator 102 may attempt to explicitly fail the corresponding transaction by performing a put if absent operation against the transaction table that attempts to add a row to the transaction table keyed by the write timestamp and having an invalid commit timestamp value (e.g., −1).

If the row does exist in the transaction table, then the commit timestamp value is obtained from the row.

If the commit timestamp value is an invalid commit timestamp (e.g., −1), then the transaction that started at the write timestamp has been explicitly failed.

If the commit timestamp value is valid, then the transaction orchestrator 102 determines whether the valid commit timestamp value is ordered before or after the current transaction start timestamp. If ordered before, then the value associated with the write timestamp is the latest value in the corresponding cell that committed before the current transaction was started. This value is returned for the cell by the transaction orchestrator 102 at 1008.

After a first performance of steps 1005, 1006, and 1007 by the transaction orchestrator 102, the latest time stamped database value read from the cell may have been written by a transaction that has been explicitly failed, not yet committed, or that committed after the current transaction was started. When this occurs, the transaction orchestrator 102 repeats steps 1005, 1006, and 1007 as often as necessary until a valid value can be read from the cell or until it is determined that no valid value exists in the cell. When repeating steps 1005, 1006, and 1007 for the cell, the snapshot timestamp associated with a cell during the previous performance of steps 1005, 1006, and 1007 is set to the write timestamp read from the cell during the previous performance. In FIG. 10, a dashed box is drawn around interactions 1005, 1006, and 1007 to indicate that these interactions may be successively repeated multiple times by the transaction orchestrator 102 when attempting to obtain a valid time stamped database value from a requested cell.

Implementing Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "non-transitory media" as used herein refers to any media that store data and/or instructions that cause a machine to operation in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Extensions and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising the steps of:
obtaining a first timestamp value from a timestamp service;
reading a database value stored in a database table cell;
obtaining a write timestamp value associated with the database value;
based on the write timestamp value associated with the database value, reading a second timestamp value from a row of a transaction table, wherein the row of the transaction table associates the write timestamp value with the second timestamp value;

providing the database value to a client application in context of a first transaction in response to determining, based on a comparison between the first timestamp value and the second timestamp value, that a second transaction that wrote the database value to the cell committed before the first transaction started;

wherein the database table cell comprises a plurality of database values, and the provided database value is selected from the plurality of database values based on the comparison between the first timestamp value and the second timestamp value; and wherein the method is performed by one or more computing devices.

2. The method of claim 1, wherein the first timestamp value represents a start transaction timestamp of the first transaction.

3. The method of claim 1, wherein the write timestamp value corresponding to the database value represents a start transaction timestamp of the second transaction that wrote the database value to the cell.

4. The method of claim 1, wherein the second timestamp value represents a commit timestamp of the second transaction that wrote the database value to the cell.

5. The method of claim 1, wherein the database value is associated with the write timestamp value in the cell.

6. The method of claim 1, wherein obtaining the write timestamp value associated with the database value includes reading the write timestamp value from the cell.

7. The method of claim 1, further comprising acquiring a lock on the row of the transaction table prior to reading the second timestamp value from the row.

8. The method of claim 7, wherein the lock is a read lock.

9. The method of claim 7, wherein the row is keyed in the database table by the write timestamp value.

10. The method of claim 7, further comprising releasing the lock on the row prior to reading the second timestamp value from the row.

11. A system comprising:
one or more processors;
one or more computer-readable media storing instructions which, when executed by the one or more processors, causes performance of the steps of:
obtaining a first timestamp value from a timestamp service;
reading a database value stored in a database table cell;
obtaining a write timestamp value associated with the database value;
based on the write timestamp value associated with the database value, reading a second timestamp value from a row of a transaction table, wherein the row of the transaction table associates the write timestamp value with the second timestamp value;
providing the database value to a client application in context of a first transaction in response to determining, based on a comparison between the first timestamp value and the second timestamp value, that a second transaction that wrote the database value to the cell committed before the first transaction started;
wherein the database table cell comprises a plurality of database values, and the provided database value is selected from the plurality of database values based on the comparison between the first timestamp value and the second timestamp value.

12. The system of claim 11, wherein the first timestamp value represents a start transaction timestamp of the first transaction.

13. The system of claim 11, wherein the write timestamp value corresponding to the database value represents a start transaction timestamp of the second transaction that wrote the database value to the cell.

14. The system of claim 11, wherein the second timestamp value represents a commit timestamp of the second transaction that wrote the database value to the cell.

15. The system of claim 11, wherein the database value is associated with the write timestamp value in the cell.

16. The system of claim 11, wherein obtaining the write timestamp value associated with the database value includes reading the write timestamp value from the cell.

17. The system of claim 11, the one or more computer-readable media further comprising instructions which, when executed by the one or more processors, cause performance of the step of acquiring a lock on the row of the transaction table prior to reading the second timestamp value from the row.

18. The system of claim 17, wherein the lock is a read lock.

19. The system of claim 17, wherein the row is keyed in the database table by the write timestamp value.

20. The system of claim 17, the one or more computer-readable media further comprising instructions which, when executed by the one or more processors, cause performance of the step of releasing the lock on the row prior to reading the second timestamp value from the row.

* * * * *